United States Patent
Uetani et al.

(10) Patent No.: US 8,073,269 B2
(45) Date of Patent: Dec. 6, 2011

(54) IMAGE DECODING APPARATUS AND IMAGE DECODING METHOD

(75) Inventors: Yoshiharu Uetani, Kanagawa (JP); Naoyuki Kai, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1044 days.

(21) Appl. No.: 11/743,465

(22) Filed: May 2, 2007

(65) Prior Publication Data
US 2007/0286502 A1    Dec. 13, 2007

(30) Foreign Application Priority Data
May 9, 2006    (JP) .................... 2006-130667

(51) Int. Cl.
G06K 9/36 (2006.01)
G06K 9/46 (2006.01)
H04N 7/12 (2006.01)
H04N 11/02 (2006.01)
H04N 11/04 (2006.01)

(52) U.S. Cl. ........ 382/233; 382/232; 382/236; 382/238; 375/240.01; 375/240.12; 375/240.15

(58) Field of Classification Search ............... 382/233, 382/232, 236, 238; 375/240.01, 240.12, 375/240.15
See application file for complete search history.

(56) References Cited

U.S. PATENT DOCUMENTS

| 7,024,052 | B2 | 4/2006 | Hirase |
| 7,333,542 | B1* | 2/2008 | Tajime et al. ............ 375/240.03 |
| 2001/0012402 | A1* | 8/2001 | Ozaki ............................ 382/233 |
| 2007/0195882 | A1* | 8/2007 | Tichelaar et al. ........ 375/240.16 |

FOREIGN PATENT DOCUMENTS

| JP | 9-252469 | 9/1997 |
| JP | 2000-4440 | 1/2000 |
| WO | WO 2005/088983 A2 | 9/2005 |

OTHER PUBLICATIONS

Office Action issued Oct. 12, 2010 in JP Application No. 2006-130667.

\* cited by examiner

*Primary Examiner* — Bhavesh Mehta
*Assistant Examiner* — Bernard Krasnic
(74) *Attorney, Agent, or Firm* — Oblon, Spivak, McClelland, Maier & Neustadt, L.L.P.

(57) ABSTRACT

An image decoding apparatus obtains the prediction error or a restored image of the encoding object image by inverse processing of the encoding processing of encoded image data encoded by motion compensation predictive coding, in which a restored image is obtained by adding the prediction error and a reference image, a reduced size image of the restored image is generated and stored along with the restored image; wherein, when an image is encoded by an encoding mode that uses reference pixels that include two times or more number of pixels of a region of a predetermined number of pixels, a reference image is obtained by reading out and expanding the stored reduced size image of the restored image, and when an image is encoded using reference pixels of less than two times a number of pixels of the predetermined number of pixels, the reference image is obtained from the stored restored image.

8 Claims, 18 Drawing Sheets

FIG.2

| | | | | | | | | | | | | | |
|---|---|---|---|---|---|---|---|---|---|---|---|---|---|
| CODING ORDER | I2 | B0 | B1 | P5 | B3 | B4 | P8 | B6 | B7 | P9 | P12 | B10 | B11 |
| DISPLAY ORDER | | B0 | B1 | I2 | B3 | B4 | P5 | B6 | B7 | P8 | P9 | B10 | B11 | P12 |
| REFERENCE IMAGE MEMORY WRITE | | | | | | | | | | | | | | |
| REGION 221, 222 | I2 | | | P5 | | | P8 | | | P9 | P12 | | | |
| REGION 223, 224 | I2 | | | P5 | | | P8 | | | P9 | P12 | | | |
| | Px | Px | | | | | | | | | | | | |
| DISPLAY MEMORY WRITE | | | | | | | | | | | | | | |
| REGION 231 | I2 | B0 | B1 | P5 | B3 | B4 | P8 | B6 | B7 | P9 | P12 | B10 | B11 | |
| REGION 232 | I2 | | | | B3 | B4 | | B6 | B7 | | | B10 | B11 | |
| REGION 233 | | B0 | B1 | P5 | | | P8 | | | P9 | P12 | | | |
| READ OUT FOR DISPLAY | | B0 | B1 | I2 | B3 | B4 | P5 | B6 | B7 | P8 | P9 | B10 | B11 | P12 |

FIG.6

| CODING ORDER | I2 | B0 | B1 | P5 | B3 | B4 | P8 | B6 | B7 | P9 | P12 | B10 | B11 | | |
|---|---|---|---|---|---|---|---|---|---|---|---|---|---|---|---|
| DISPLAY ORDER | | B0 | B1 | I2 | B3 | B4 | P5 | B6 | B7 | P8 | P9 | B10 | B11 | P12 | |

REFERENCE IMAGE MEMORY WRITE

| REGION 225 | I2 | | | P5 | | | P8 | | | P9 | P12 | | | | |
| REGION 226 | I2 | I2 | I2 | I2 | I2 | I2 | P8 | P8 | P8 | P9 | P9 | P9 | P9 | | |
| | Px | Px | Px | P5 | P5 | P5 | P5 | P5 | P5 | P9 | P12 | P12 | P12 | | |

DISPLAY MEMORY WRITE

| REGION 241 | I2 | B0 | B1 | P5 | B3 | B4 | P8 | B6 | B7 | P9 | P12 | B10 | B11 | P | |
| REGION 242 | | B0 | B0 | B0 | B3 | B3 | B3 | B6 | B6 | B6 | P12 | P12 | P12 | P12 | P12 |
| REGION 243 | I2 | | B1 | B1 | B1 | B4 | B4 | B4 | B7 | B7 | B7 | B10 | B10 | B10 | B |
| REGION 244 | Px | Px | I2 | I2 | I2 | I2 | P8 | P8 | P8 | P8 | P8 | P8 | B11 | B11 | B11 |
| | Px | Px | P5 | P5 | P5 | P5 | P5 | P5 | P5 | P9 | P9 | P9 | P9 | P | P |

| READ OUT FOR DISPLAY | | B0 | B1 | I2 | B3 | B4 | P5 | B6 | B7 | P8 | P9 | B10 | B11 | P12 | |

FIG.14A

| INPUT RANGE | index (bin) |
|---|---|
| 91 ~ 127 | 0 1111 |
| 54 ~ 90 | 0 1110 |
| 49 ~ 53 | 0 1101 |
| 35 ~ 48 | 0 1100 |
| 28 ~ 34 | 0 1011 |
| 22 ~ 27 | 0 1010 |
| 18 ~ 21 | 0 1001 |
| 14 ~ 17 | 0 1000 |
| 11 ~ 13 | 0 0111 |
| 8 ~ 10 | 0 0110 |
| 6 ~ 7 | 0 0101 |
| 4 ~ 5 | 0 0100 |
| 3 | 0 0011 |
| 2 | 0 0010 |
| 1 | 0 0001 |
| 0 | 0 0000 |
| -1 | 1 0001 |
| -2 | 1 0010 |
| -3 | 1 0011 |
| -5 ~ -4 | 1 0100 |
| -7 ~ -6 | 1 0101 |
| -10 ~ -8 | 1 0110 |
| -13 ~ -11 | 1 0111 |
| -17 ~ -14 | 1 1000 |
| -21 ~ -18 | 1 1001 |
| -27 ~ -22 | 1 1010 |
| -34 ~ -28 | 1 1011 |
| -48 ~ -35 | 1 1100 |
| -53 ~ -49 | 1 1101 |
| -90 ~ -54 | 1 1110 |
| -100 ~ -91 | 1 1111 |
| -128 ~ -101 | 1 0000 |

FIG.14B

| INPUT RANGE | index (bin) |
|---|---|
| 11 ~ 127 | 0 11 |
| 3 ~ 10 | 0 10 |
| 1 ~ 2 | 0 01 |
| 0 | 0 00 |
| -2 ~ -1 | 1 01 |
| -10 ~ -3 | 1 10 |
| -27 ~ -11 | 1 11 |
| -128 ~ -28 | 0 00 |

FIG.19A

| index (bin) | REPRESENTATIVE VALUE |
|---|---|
| 0 1111 | 95 |
| 0 1110 | 58 |
| 0 1101 | 51 |
| 0 1100 | 39 |
| 0 1011 | 31 |
| 0 1010 | 24 |
| 0 1001 | 19 |
| 0 1000 | 15 |
| 0 0111 | 12 |
| 0 0110 | 9 |
| 0 0101 | 6 |
| 0 0100 | 4 |
| 0 0011 | 3 |
| 0 0010 | 2 |
| 0 0001 | 1 |
| 0 0000 | 0 |
| 1 0001 | -1 |
| 1 0010 | -2 |
| 1 0011 | -3 |
| 1 0100 | -4 |
| 1 0101 | -6 |
| 1 0110 | -9 |
| 1 0111 | -12 |
| 1 1000 | -15 |
| 1 1001 | -19 |
| 1 1010 | -24 |
| 1 1011 | -31 |
| 1 1100 | -39 |
| 1 1101 | -51 |
| 1 1110 | -58 |
| 1 1111 | -95 |
| 1 0000 | -110 |

FIG.19B

| index (bin) | REPRESENTATIVE VALUE |
|---|---|
| 0 11 | 14 |
| 0 10 | 4 |
| 0 01 | 1 |
| 0 00 | 0 |
| 1 01 | -1 |
| 1 10 | -4 |
| 1 11 | -14 |
| 0 00 | -35 |

IMAGE DECODING APPARATUS AND IMAGE DECODING METHOD

CROSS REFERENCE TO RELATED APPLICATION

This application is based upon and claims the benefit of priority from the prior Japanese Patent Application No. 2006-130667 filed on May 9, 2006; the entire contents of which are incorporated herein by reference.

BACKGROUND OF THE INVENTION

1. Field of the Invention

The present invention relates to an image decoding apparatus and image decoding method that enables a reduction in a memory bandwidth.

2. Description of the Related Art

In recent years, accompanying the spread of the MPEG (Moving Picture Experts Group) and H.264 standards and the like, image processing has become digitalized. As a result, the transmission of high quality HD image data is also being widely performed. On the other hand, because of the widespread use of portable terminals such as mobile phones, the necessity to display images of a comparatively low resolution is also high. Further, display apparatuses for displaying standard quality SD images are also in widespread use. Thus, the demand for devices that can generate images of a lower resolution (reduced image) than the resolution of the input image data is also high.

The processing speeds of most devices that are equipped with a decoding apparatus that generates a reduced image in this manner are comparatively slow. Therefore, in this kind of apparatus, there is the drawback that, in order to secure the necessary data transfer speed when performing processing to decode image data it is necessary to increase the bit width of the memory interface. For example, when the required memory bandwidth in a mobile telephone or the like is large, in order to enable storage of image data in an external memory, the number of pins of the external memory increases and the package size of the memory also increases.

In this regard, Japanese Patent Laid-Open No. 2000-4440 discloses technology that can reduce a memory bandwidth by generating an image with a reduced resolution (reduced image) when decoding high quality encoded image data. In that proposed technology, by simply compressing and retaining reference images used for decoding processing, the data amount required for decoding processing is reduced to enable reduction of the memory bandwidth.

However, according to the technology in that proposal, all the reference images are obtained by thinning-out processing, and there is thus a drawback that errors when performing difference decoding are accumulated, which deteriorates the image quality.

SUMMARY OF THE INVENTION

An image decoding apparatus according to one aspect of the present invention includes: an inverse conversion processing section into which is inputted encoded image data that is encoded for each region of a predetermined number of pixels by processing that includes motion compensation predictive coding processing that encodes a prediction error between a reference image having a predetermined time relationship and an image of an encoding object, and which is configured to obtain the prediction error or a restored image of the encoding object image by performing inverse processing of the encoding processing; a motion compensation section configured to obtain a restored image that restores an image before encoding processing for each of the regions of the predetermined number of pixels by adding the prediction error and the reference image that has undergone motion compensation; a storage section configured to store the restored image as a reference image; a reference image acquisition section configured to read out the reference image from the storage section for addition processing of the motion compensation section, wherein, when an image of a processing object of the motion compensation section is encoded by an encoding mode that uses reference pixels of a number of pixels that is two times or more greater than a number of pixels of the region of the predetermined number of pixels, the reference image acquisition section obtains a reference image by reading out a reference image that is thinned out from the storage section and performing interpolation processing.

An image decoding apparatus according to another aspect of the present invention includes: an inverse conversion processing section into which is inputted encoded image data that is encoded for each region of a predetermined number of pixels by processing that includes motion compensation predictive coding processing that encodes a prediction error between a reference image having a predetermined time relationship and an image of an encoding object, and which is configured to obtain the prediction error or a restored image of the encoding object image by performing inverse processing of the encoding; a motion compensation section configured to obtain a restored image that restores an image before encoding processing for each of the regions of the predetermined number of pixels by adding the prediction error and the reference image that has undergone motion compensation; a data amount reducing section configured to generate an image for which a data amount of the restored image has been reduced; a storage section configured to store the restored image as a reference image and also store the image in which the data amount has been reduced; and a reference image acquisition section configured to read out the reference image from the storage section for addition processing of the motion compensation section, wherein, when an image of a processing object of the motion compensation section is encoded by an encoding mode that uses reference pixels of a number of pixels that is two times or more greater than a number of pixels of the region of the predetermined number of pixels, the reference image acquisition section obtains a reference image by reading out a reference image in which a data amount has been reduced from the storage section and restoring the data amount of the reference image to the original data amount.

BRIEF DESCRIPTION OF THE DRAWINGS

FIG. 2 is an explanatory drawing for explaining writing and reading to and from each region of a memory 200 for decoding processing and display;

FIG. 6 is an explanatory drawing for explaining writing and reading to and from each region of a memory 201 for decoding processing and display;

FIG. 14A and FIG. 14B are explanatory drawings that illustrate quantization tables;

FIG. 19A and FIG. 19B are explanatory drawings that illustrate inverse quantization tables.

DETAILED DESCRIPTION OF THE PREFERRED EMBODIMENTS

Hereunder, embodiments of the present invention are described in detail with reference to the attached drawings.

First Embodiment

Figure 1:
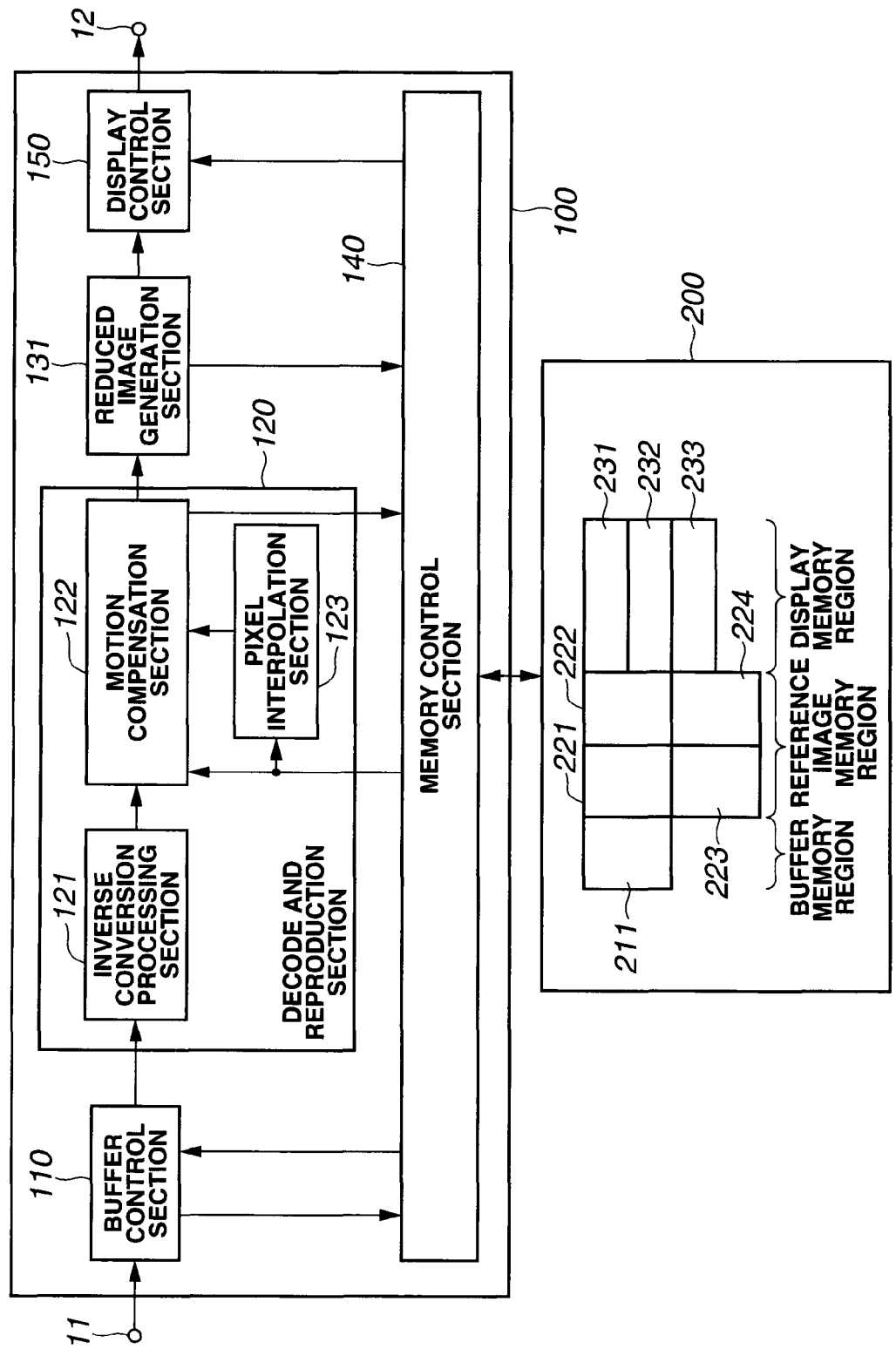
FIG. 1 is a block diagram that illustrates an image decoding apparatus according to a first embodiment of the present invention.

FIG. 1 is a block diagram that illustrates an image decoding apparatus according to a first embodiment of the present invention.

In FIG. 1, image data that is encoded by an unshown image encoding circuit is inputted into an input terminal 11 of a video decoder 100. At the image encoding circuit a video signal is quantized by DCT processing in block units, and variable length coding processing using a predetermined variable length coding table is further performed to obtain encoded image data. The image encoding circuit has a differential circuit, an inverse quantization circuit, an inverse DCT circuit, a motion compensation circuit and the like. The image encoding circuit is also capable of subjecting an inputted video signal to motion compensation predictive coding by determining a prediction error between the inputted video signal and reference images before and after a predetermined period and subjecting the thus-determined prediction error to DCT processing, quantization processing, and variable length coding processing.

Methods of predictive coding include unidirectional predictive coding which performs motion compensation using a temporally forward or rearward reference image and encodes a prediction error, bidirectional predictive coding that performs motion compensation using the mean of both a forward and a rearward reference images and encodes a prediction error, and dual-prime predictive coding that refers to two kinds of phases (in-phase line and antiphase line) of a forward reference image to perform motion compensation using the mean of the two phases and encode a prediction error.

Since a frame that is encoded by intraframe coding (hereunder, referred to as "I picture") is encoded using only intraframe information (referred to as "intraframe predictive coding"), encoding can be performed using only the independent encoding data. Therefore, in the MPEG standards, in order to suppress error transmissions and the like, an I picture is inserted at a comparatively short period. According to the MPEG standards, a forward-predictive coded frame (hereunder, referred to as "P picture") can be obtained by unidirectional predictive coding from the forward side using the I picture as a reference image or intraframe predictive coding that is the same as an I picture in macroblock units. In this connection, the P picture can also be obtained by unidirectional predictive coding using another P picture on the forward side. Further, for a P picture according to the MPEG2 standards, as shown in the ninth frame of FIG. 2, when the immediately preceding picture type in the display order is a P picture (or I picture), dual-prime predictive coding that refers to two kinds of phases (in-phase line and antiphase line) can also be used in macroblock units. Herein, a P picture that includes a dual-prime predictive-coded macroblock is referred to as a "dual-prime picture". Further, a bidirectionally predictive-coded frame (hereunder, referred to as "B picture") can be obtained, using a frontward and a rearward I picture or P picture as a reference image, by unidirectional predictive coding from the front or rear, bidirectional predictive coding from the front and the rear, or intraframe predictive coding that is the same as an I picture in macroblock units.

In this connection, for a video signal to be processed, the sampling clocks differ with respect to a luminance signal and a color difference signal. For example, if a case is assumed in which the sampling clock of a color difference signal is ¼ of the frequency of the sampling clock of a luminance signal, the size ratio between a luminance block and a color difference block is 1:4. In this case, a macroblock is constituted by six DCT blocks of four luminance blocks and one color difference block each as an encoding unit. Motion vector detection is also performed using macroblock units (in MPEG2, motion vector detection is also performed in units in which macroblocks are divided into even-numbered lines and odd-numbered lines).

Image data that underwent motion compensation predictive coding is inputted to the input terminal 11. This encoded image data is supplied to a decode and reproduction section 120 through a buffer control section 110. The buffer control section 110 temporarily stores the encoded image data in a memory 200 through a memory control section 140 that is described later, and reads out and supplies the encoded image data to the decode and reproduction section 120. The buffer control section 110 supplies the encoded image data to the decode and reproduction section 120 at a rate that corresponds to the decoding rate in the decode and reproduction section 120.

The decode and reproduction section 120 has an inverse conversion processing section 121, a motion compensation section 122, and a pixel interpolation section 123. The inverse conversion processing section 121 is capable of performing variable length decoding processing, inverse DCT processing, and inverse quantization processing. The inverse conversion processing section 121 performs variable length decoding of encoded image data that is inputted. The inverse conversion processing section 121 subjects the encoded image data that has undergone variable length decoding to inverse quantization processing to restore the image data to the conversion coefficient prior to quantization processing on the encoding side. The inverse conversion processing section 121 also subjects the conversion coefficient to inverse DCT processing. Thus, the inverse conversion processing section 121 obtains image data that is approximate to the image data before DCT processing on the encoding side.

The output from the inverse conversion processing section 121 is supplied to the motion compensation section 122. When the encoded image data that is inputted to the decode and reproduction section 120 is encoded as an intra macroblock that has undergone intraframe predictive coding (intra coding), the output of the inverse conversion processing section 121 is image data that has been restored (restored image data). When the encoded image data that is inputted into the decode and reproduction section 120 is encoded as a unidirectionally predictive-coded macroblock or a bidirectionally predictive-coded macroblock (non-intra macroblock), the output of the inverse conversion processing section 121 is a differential value with a reference block. In this case, the motion compensation section 122 generates a predictive pixel macroblock by reading out one portion of a reference image that is stored in the memory 200 on the basis of a motion vector, and restores image data that is approximate to the image data prior to encoding by adding the output of the inverse conversion processing section 121 and the predictive pixel macroblock.

The image data that has undergone decoding processing (restored image data) from the motion compensation section 122 is supplied to a reduced image generation section 131 and also supplied to the memory 200 via the memory control section 140. The reduced image generation section 131 generates image data of a reduced image (reduced image data) from the inputted restored image data and outputs the reduced image data. The reduced image data from the reduced image generation section 131 is also supplied to the memory 200 via the memory control section 140. The memory control section 140 that constitutes a reference image acquiring unit controls writing and reading to and from the memory 200 of restored image data acquired from the motion compensation section 122 and reduced image data acquired from the reduced image generation section 131.

The memory 200 has a buffer memory region 211, reference image memory regions 221 to 224, and display memory regions 231 to 233. The buffer memory region 211 is a region that stores coding data from the buffer control section 110. The memory regions 221 to 224 are regions that store restored image data from the motion compensation section 122 as image data of reference images (reference image data). The memory regions 231 to 233 are regions that store reduced image data from the reduced image generation section 131 for display use.

According to the present embodiment, when storing reference image data in the memory regions 221 to 224, the memory control section 140 divides a restored image of one frame into pixels in even numbered rows and pixels in odd numbered rows, and stores the pixel data of the pixels in even numbered rows in the memory region 221 or 223 and stores the pixel data of the pixels in odd numbered rows in the memory region 222 or 224. Further, the memory control section 140 stores the reduced image data from the reduced image generation section 131 in the respective regions 231 to 233 for each frame.

In this connection, the start addresses for writing reference image data that are required by the motion compensation section 122 are in macroblock units, and the memory control section 140 performs writing of reference image data to the memory 200 with good efficiency such that there is no superfluous increase in the memory bandwidth.

In contrast, when reading out reference image data, for motion compensation predictive decoding, start addresses for reading out reference image data that are originally required by the motion compensation section 122 are in one pixel units, and since these are smaller than the readout units from the memory 200 of the memory control section 140, superfluous memory access occurs and the memory bandwidth becomes relatively high. For example, when half-pel is set for both the horizontal and vertical directions as a frame motion compensation type of movement vector, a block in which one pixel is added in the horizontal and vertical directions, respectively, with respect to a macroblock is used as a reference image block. For example, when a macroblock for decoding processing is 16×16 pixels, readout of a reference image block of 17×17 pixels is performed. Further, with respect to a macroblock for which bidirectional predictive coding or dual-prime predictive coding has been used, the number of reference pixels is large in comparison to a unidirectionally predictive-coded macroblock and the required memory bandwidth doubles.

Therefore, according to the present embodiment, when reading out reference image data, only with respect to a macroblock for which bidirectional predictive coding or dual-prime predictive coding has been used for which the number of reference pixels is large and the readout rate is particularly high, the motion compensation section 122 reads out only the pixel data of either the even numbered rows or the odd numbered rows and outputs that data to the pixel interpolation section 123 as a thinned-out reference image. In this connection, regarding macroblocks encoded by unidirectional predictive coding other than dual-prime predictive coding (including a unidirectionally predictive-coded macroblock of a B picture), the motion compensation section 122, as usual, reads out reference image data of all pixels and outputs the data as a reference image to the motion compensation section 122.

Here, in the case of macroblocks encoded by unidirectional predictive coding other than dual-prime predictive coding, the motion compensation section 122 decides readout positions (blocking positions) of restored image data of I or P pictures that are stored in memory regions 221 to 224 of the memory 200 in accordance with a motion vector. The memory control section 140 outputs the pixel data inside the blocks at the blocking positions that are decided. More specifically, for macroblocks encoded by unidirectional predictive coding other than dual-prime predictive coding, the memory control section 140 outputs a reference image block of a number of pixels that corresponds to the macroblock.

In contrast, for a bidirectionally predictive-coded macroblock and a dual-prime predictive-coded macroblock, a reference pixel block from two frames or two kinds of reference pixel blocks from a single frame are necessary, and originally it is necessary to perform decoding processing that uses double the number of reference pixels of a case on a macroblock encoded by unidirectional predictive coding other than dual-prime predictive coding. That is, originally, for a single macroblock it is necessary to use reference pixels of a number of pixels that is two times or more the number of pixels of the macroblock.

In the present embodiment, the motion compensation section 122 reads out through the memory control section 140 a reference image block consisting of pixel data of only either the even numbered rows or the odd numbered rows from the respective reference frames (hereunder, referred to as "thinned-out reference image block") as reference image data for a bidirectionally predictive-coded macroblock.

When a thinned-out reference image block is received, the pixel interpolation section 123 that constitutes the reference image acquiring unit interpolates pixels in even numbered rows or odd numbered rows by interpolation processing to create a reference image block of a normal number of pixels from the thinned-out reference image block. The pixel interpolation section 123 supplies the reference image block created by interpolation to the motion compensation section 122. The motion compensation section 122 generates a restored image block by adding a predictive pixel block that is created from the reference image block that is supplied and a prediction error from the inverse conversion processing section 121.

The thinned-out reference image block is constituted by approximately half the number of pixels of a normal reference image block, and in the present embodiment, with respect also to a macroblock encoded by bidirectional predictive coding and a macroblock encoded by dual-prime predictive coding, decoding processing is possible by reading out a number of reference pixels that is the same as the case of a macroblock encoded by unidirectional predictive coding other than dual-prime predictive coding.

Figure 3:
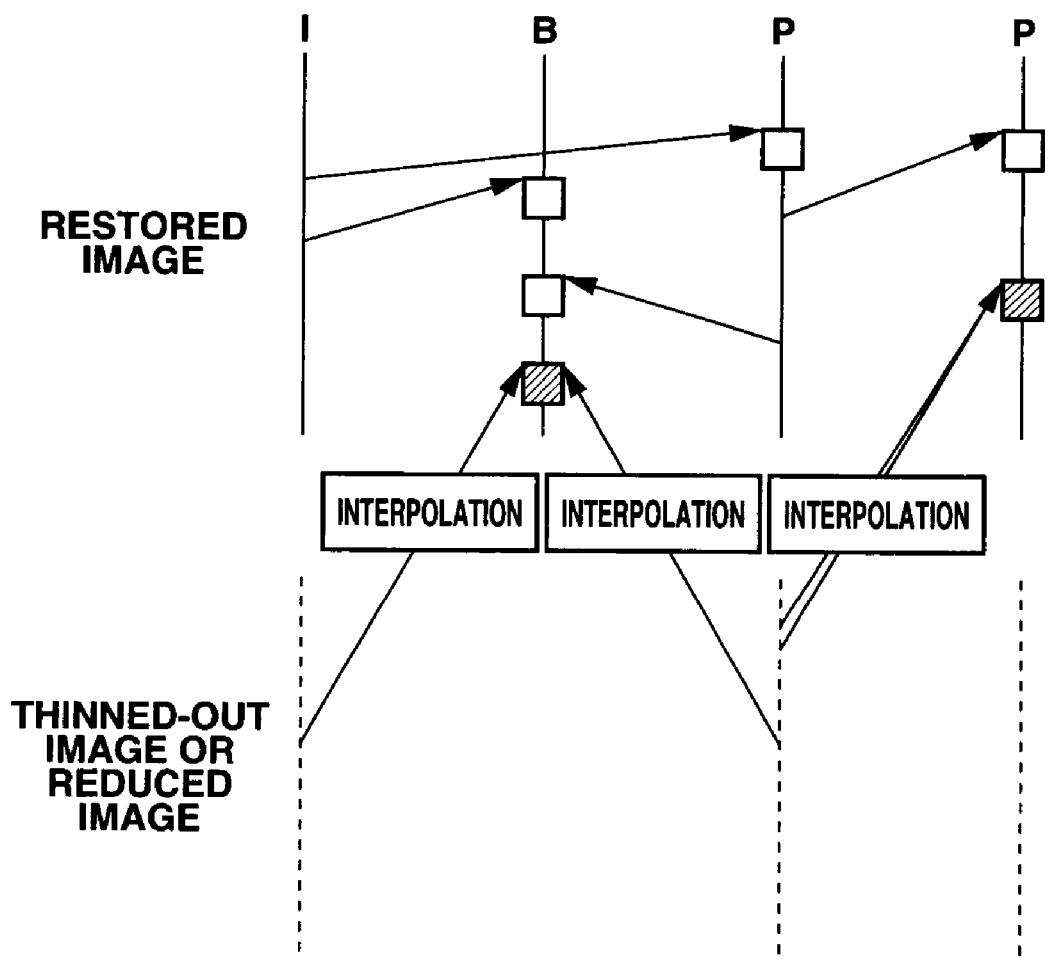
FIG. 3 is an explanatory drawing for describing a reference image used for decoding.
Figure 4:
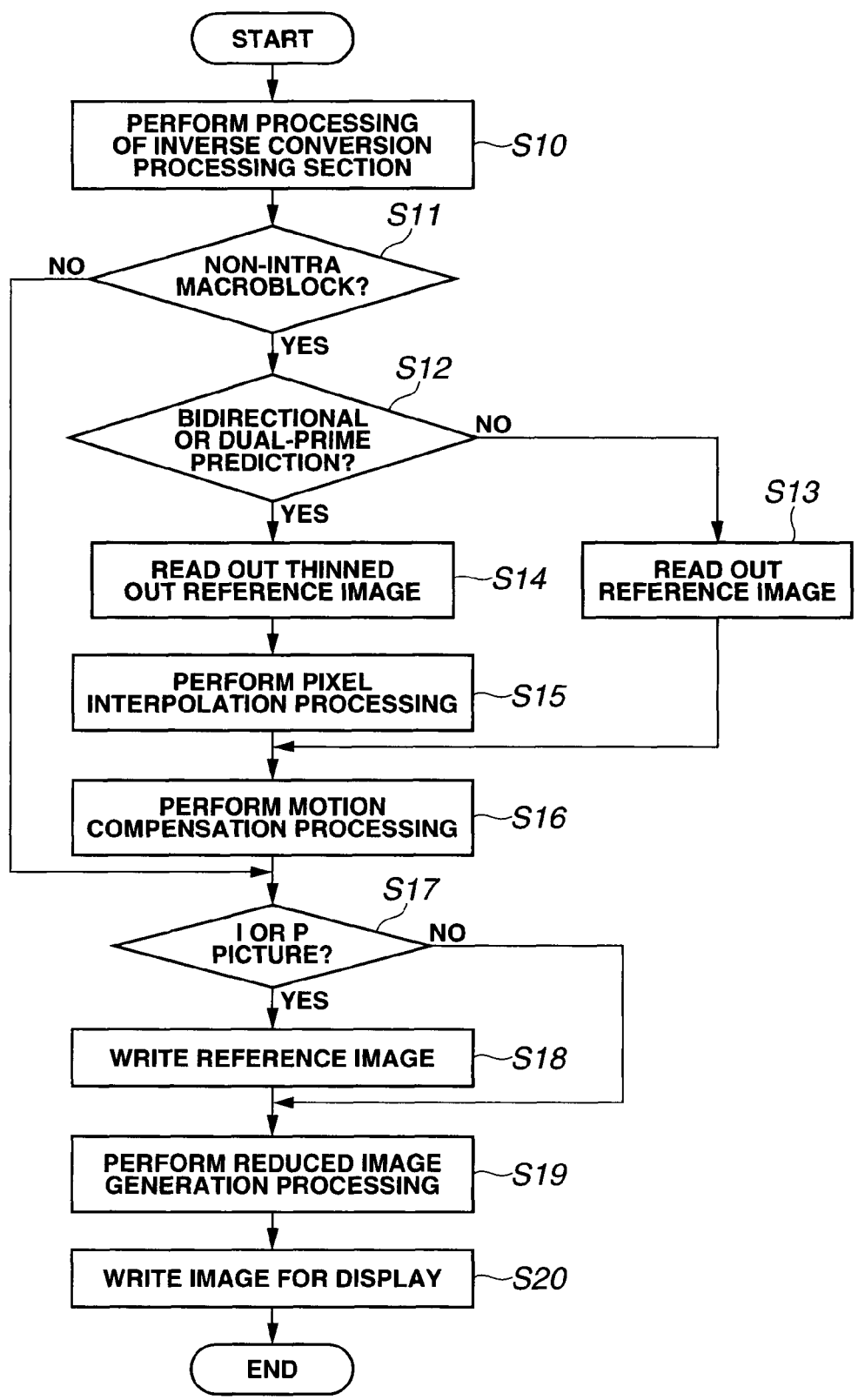
FIG. 4 is a flowchart for explaining decoding processing for each macroblock.

Next, the operations of the embodiment configured in this manner are described with reference to FIG. 2 to FIG. 4. FIG. 2 is an explanatory drawing for explaining writing and reading to and from each region of the memory 200 for decoding processing and display. In FIG. 2, blocks are separated in the horizontal direction to represent the times of frame units. Within each block the picture type as the object is indicated by I, P, or B. The numeral attached to each picture type indicates the frame number. FIG. 3 is an explanatory drawing for describing a reference image used for decoding, and FIG. 4 is a flowchart for explaining decoding processing for each macroblock.

Encoded image data is inputted to the input terminal 11. The inputted encoded image data is supplied to the memory region 211 inside the memory 200 by the buffer control section 110 and held temporarily. The buffer control section 110 outputs the inputted encoded image data to the decode and reproduction section 120 at a predetermined decoding processing rate. At step S10 in FIG. 4, the inverse conversion processing section 121 of the decode and reproduction section 120 subjects the encoded image data to variable length decoding, inverse quantizing, and inverse DCT processing to restore the encoded image data to the data prior to DCT processing on the encoding side.

(a) When the encoded image data that is inputted is encoded by intraframe coding, the output of the inverse conversion processing section 121 with respect to this encoded image data is a restored image macroblock. In this case, steps S12 to S16 are omitted, and the motion compensation section 122 outputs the output of the inverse conversion processing section 121 in that state as data of a restored image macroblock.

FIG. 3 shows a reference image used for motion compensation predictive decoding processing. The solid lines and broken lines under the symbols I, B, and P that indicate the picture types in FIG. 3 respectively indicate a restored image and a thinned-out restored image. Further, the square marks in FIG. 3 indicate macroblocks that are restored (recreated) by decoding processing using a reference image, and reference images used for decoding processing are indicated by the starting points of the arrows. As shown in FIG. 3, a reference image is not used for decoding processing of an I picture.

The restored image macroblock data from the motion compensation section 122 is supplied to the reduced image generation section 131 and, in the case of decoding processing of an I picture or a P picture, is also supplied through the memory control section 140 to the memory 200. The memory control section 140 stores the restored image macroblock data from the motion compensation section 122 as reference image data in the regions 221 to 224 of the memory 200 (step S18). The reduced image generation section 131 generates reduced image macroblock data for display from the restored image macroblock data (step S19). The memory control section 140 also stores the reduced image data from the reduced image generation section 131 in the regions 231 to 233 of the memory 200.

A display control section 150 controls read out from each region of the memory 200 so as to absorb a difference between the encoding order and display order. When encoding, as shown by the frame numbers that are suffixes to the picture types shown in FIG. 2, for example, encoded image data of B pictures of the third and fourth frames is generated by bidirectional predictive coding using images of the second and fifth frames, and the encoded image data of B pictures of the sixth and seventh frames are generated by bidirectional predictive coding using images of the fifth and eighth frames. More specifically, as shown in FIG. 2, the encoding order is the order of the second, zeroth, first, fifth, third, fourth . . . frames. Data that has undergone inverse conversion processing is obtained in this frame order from the inverse conversion processing section 121.

Accordingly, reduced image of restored image data of the I picture (I2) of the second frame is displayed after a reduced image based on B pictures of the zeroth and first frames (B0 and B1) that are decoded after the I picture (I2). Therefore, a reduced image of the I picture (I2) is also held in the region 232 of the memory 200 when decoding each macroblock thereof (step S20).

According to the present embodiment, when storing a restored image from the motion compensation section 122 as a reference image, to facilitate a thinned-out readout, the restored image is divided into data of even numbered rows and data of odd numbered rows and the two kinds of data are stored in different regions. More specifically, the memory control section 140 divides the restored image data into data of pixels in even numbered rows and data of pixels in odd numbered rows and stores the data in the different regions 221 and 223 or regions 222 and 224. For example, restored image data of the I picture (I2) of the second frame is stored in the regions 221 and 222 as shown in FIG. 2.

(b) When the encoded image data that is inputted is encoded by interframe predictive coding (unidirectional predictive coding or bidirectional predictive coding), the output of the inverse conversion processing section 121 with respect to this encoded image data is a prediction error. For example, a case is assumed here in which a unidirectional prediction error macroblock that has not undergone dual-prime prediction of the P picture (P5) of the fifth frame in FIG. 2 is supplied to the motion compensation section 122. In this case, the motion compensation section 122 moves the operation to step S13 via step S12 to provide a readout address in accordance with a motion vector to the memory control section 140, and reads out a reference image block from a restored images of the I picture (I2) of the second frame stored in regions 221 and 222 of the memory 200. The memory control section 140 reads out a reference image block of a size that corresponds to the macroblock and outputs the reference image block to the motion compensation section 122. That is, in the decoding processing of the unidirectionally predictive-coded macroblock that is not subjected to dual-prime prediction of the P picture (P5), as shown by the plain square marks in FIG. 3, it is sufficient to readout reference image data of approximately one macroblock for the decoding processing of one macroblock (the same applies for a unidirectionally predictive-coded macroblock of a B picture).

The motion compensation section 122 adds a predictive pixel block that is generated from a reference image block that is read out and a prediction error macroblock from the inverse conversion processing section 121 to obtain restored image block data (step S16). The restored image block data with respect to this P picture is stored in the regions 223 and 224 of the memory 200 via the memory control section 140 (in the case of a macroblock of a B picture, storing to the regions 221 to 224 of the memory 200 is not performed). Further, the restored image block data of the P picture is converted into reduced image block data at the reduced image generation section 131, and then stored in the region 232 via the memory control section 140.

Next, the coding data of the B picture (B3) of the third frame is decoded. Here, in the case of a macroblock encoded by bidirectional predictive coding the output of the inverse conversion processing section 121 is a prediction error. In this case, the motion compensation section 122 generates a restored image using the I picture (I2) and the P picture (P5). More specifically, the motion compensation section 122 provides a readout address in accordance with the motion vector to the memory control section 140 and reads out a thinned-out reference image block of a corresponding blocking position based on both a decoded image in one region (221 or 222) among restored images of the I picture (I2) of the second frame that is divided and stored in the regions 221 and 222 of the memory 200 and a decoded image in one region (223 or 224) among restored images of the P picture (P5) of the fifth frame that is divided and stored in the regions 223 and 224 of the memory 200 (step S14).

The data of these thinned-out reference image blocks is supplied to the pixel interpolation section 123. The pixel interpolation section 123 interpolates the even numbered rows or odd numbered rows of the thinned-out reference image block that is inputted using an interpolation filter or the like to obtain reference image blocks for the I and P pictures and output the reference image blocks to the motion compensation section 122 (step S15). The motion compensation section 122 receives the reference image blocks of the I picture (I2) and the P picture (P5) to generate a predictive pixel block, and then obtains restored image block data of the B picture (B3) by adding a prediction error from the inverse conversion processing section 121 (step S16). Thus, according to the present embodiment, for decoding processing of a macroblock encoded by bidirectional predictive coding of a B picture, it is sufficient to read out pixel data of approximately one macroblock by combining thinned-out reference image blocks from the memory region 221 or 222 and the memory region 223 or 224, and decoding processing is possible by reading out a number of reference pixels that is the same as a case of a macroblock encoded by unidirectional predictive coding other than dual-prime predictive coding.

When performing decoding processing of the B picture (B3), reduced image data of an I picture (I2) that is stored in the region 231 of the memory 200 is readout, and supplied to the display control section 150. Thus, the reduced image data is provided to an unshown display section via an output terminal 12 to perform an image display.

Further, there is no necessity to store the restored image block data of the B picture since the restored image block data is not used as a reference image. Thus, the restored image block data is supplied to the reduced image generation section 131. The reduced image generation section 131 creates reduced image block data from the restored image block data. The reduced image block data is written in the region 233 of the memory 200 through the memory control section 140. The reduced image data of the B picture (B3) is read out when decoding the subsequent B picture (B4) and displayed on the display section.

Thereafter, the same operations are repeated to perform writing and reading out as shown in FIG. 2 to and from the memory 200 to obtain reduced image data for each picture. As shown in FIG. 2, the image display order is the original frame order.

In this connection, according to the present embodiment, not only for a bidirectionally predictive-coded macroblock of a B picture, but also for a macroblock encoded by dual-prime prediction of a P picture, the motion compensation section 122 reads out thinned-out reference image blocks of two kinds of corresponding blocking positions from either the region 221 or the region 222 (or, alternatively, either the region 223 or the region 224) of the memory 200. With respect to the thinned-out reference image block, the pixel interpolation section 123 interpolates pixels in even numbered rows or pixels in odd numbered rows to create a reference image block, and supply the reference image block to the motion compensation section 122 (see FIG. 3).

Accordingly, in this case also, it is sufficient to read out pixel data of approximately one macroblock by combining two kinds of thinned-out reference image blocks for the decoding processing of one macroblock, and decoding processing is possible by reading out a number of reference pixels that is the same as a case of a macroblock encoded by unidirectional predictive coding other than dual-prime predictive coding.

Thus, according to the present embodiment, by reducing the number of readout pixels of a reference image for a bidirectionally predictive-coded macroblock and a dual-prime predictive-coded macroblock, the required maximum memory bandwidth is reduced. Further, a bidirectionally predictive-coded macroblock is used only for B pictures that are not used as reference images, and thus a deterioration in image quality that is caused thereby does not affect the image quality of a subsequent decoded image. Moreover, although a dual-prime predictive-coded macroblock is used as a reference image in subsequent decoding processing, since the rate of usage in one screen is small, the influence on the image quality of a subsequent decoded image is minute. Therefore, according to the present embodiment, even when a memory bandwidth is reduced to a small memory bandwidth that is similar to the case of a unidirectionally predictive-coded macroblock that does not use a dual-prime predictive-coded macroblock, a reproduction image of high image quality can be obtained.

Second Embodiment

Figure 5:
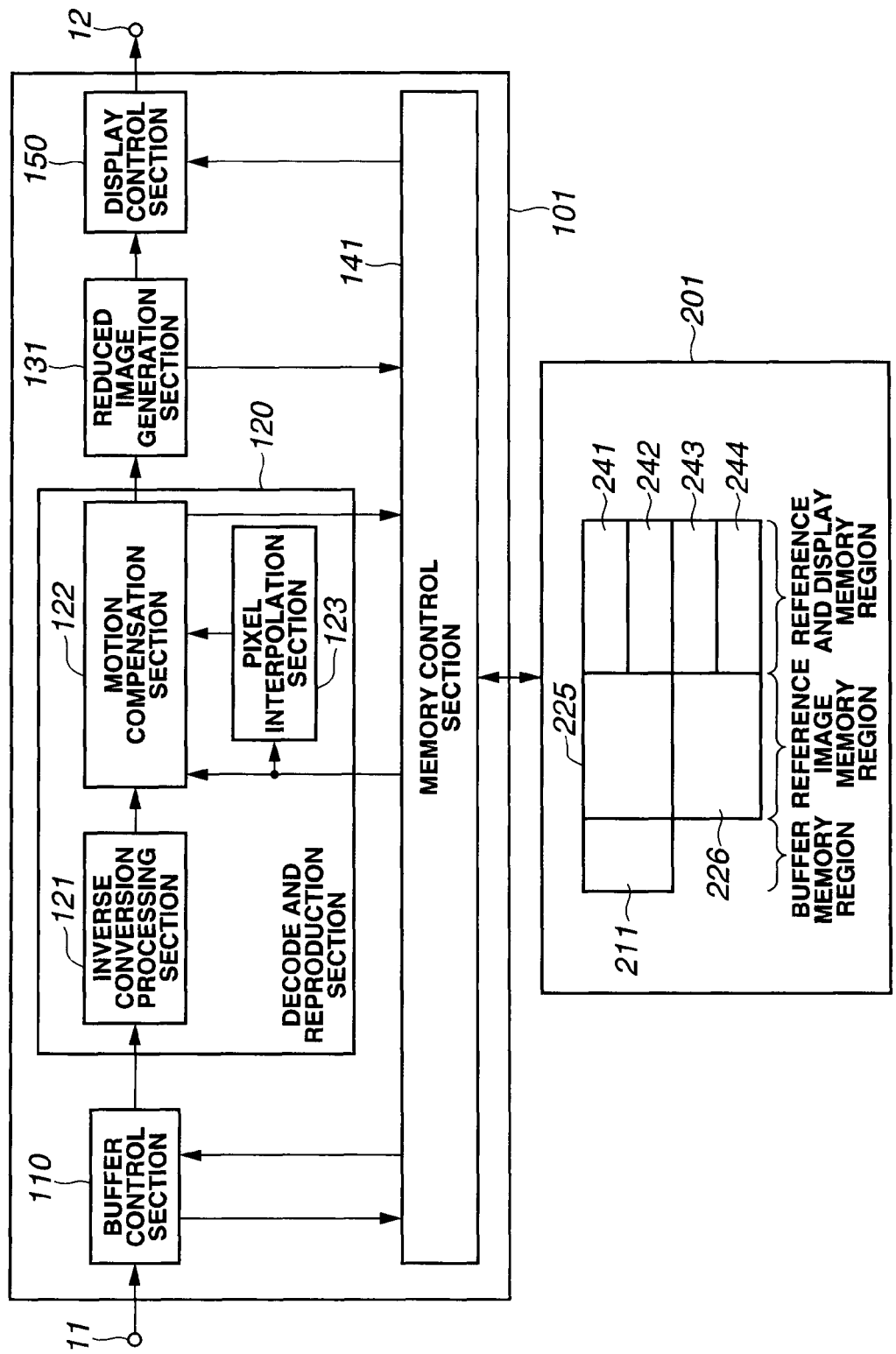
FIG. 5 is a block diagram that illustrates an image decoding apparatus according to a second embodiment of the present invention.
Figure 7:
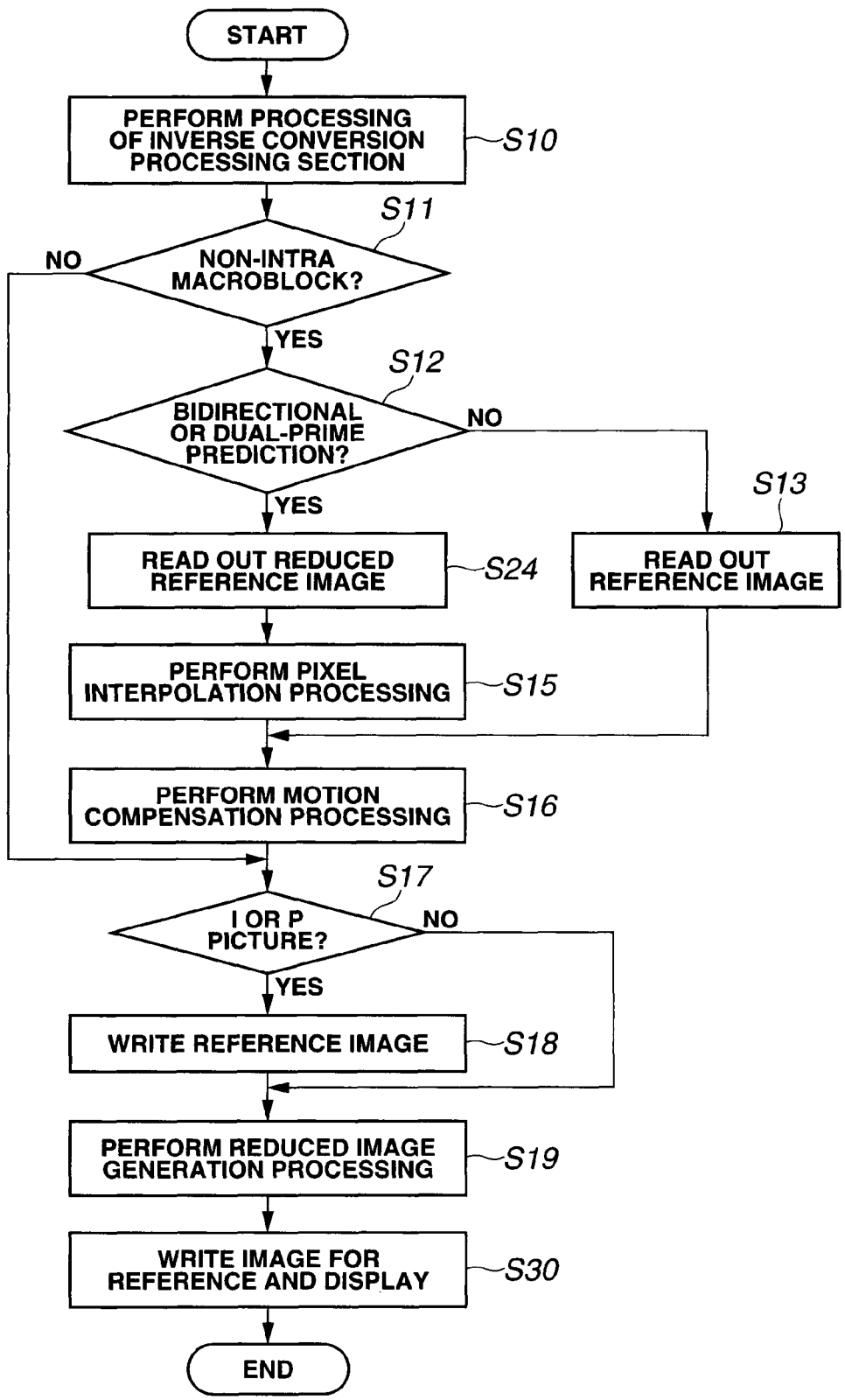
FIG. 7 is a flowchart for explaining decoding processing for each macroblock.

FIGS. 5 to 7 relate to the second embodiment of the present invention. FIG. 5 is a block diagram that illustrates an image decoding apparatus. FIG. 6 is an explanatory drawing for explaining writing and reading out to and from each region of a memory 201 for decoding processing and display, which corresponds to the explanatory drawing shown in FIG. 2. Further, FIG. 7 is a flowchart for explaining decoding processing for each macroblock. For FIGS. 5 to 7, parts that are the same as those in FIGS. 1, 2, and 4 are denoted by the same symbols, and a description of those parts is omitted hereunder.

The present embodiment enables a reduced image for display to be utilized as a reference image. The present embodiment differs from the first embodiment in that the present embodiment employs the memory 201 and a video decoder 101 that employs a memory control section 141 as a reference image acquiring unit. The memory control section 141 differs to the memory control section 140 shown in FIG. 1 only with respect to access control to the memory 201.

The memory control section 141 controls writing and reading out to and from each region of the memory 201. The memory 201 has the buffer memory region 211, reference image memory regions 225 and 226, and reference and display memory regions 241 to 244. The memory regions 225 and 226 are regions that store restored image data from the motion compensation section 122 as reference image data. Further, the memory regions 241 to 244 are regions that store reduced image data from the reduced image generation section 131.

According to the present embodiment, reduced image data that is stored in the memory regions 241 to 244 is utilized not only for display, but also as a reference image. Reduced image data from the reduced image generation section 131 is, for example, generated from a restored image by performing filtering processing and thinning-out processing.

The start addresses for writing reference image data to the memory regions 225 and 226 that the motion compensation section 122 requests are in macroblock units, and the memory control section 141 performs writing of reference image data to the memory 201 with good efficiency such that there is no superfluous increase in the memory bandwidth. Further, the start addresses for writing image data to the regions 241 to 244 are also in reduced macroblock units (or units of an integral multiple thereof), and the memory control section 141 performs writing of reference image data to the memory 201 with good efficiency such that there is no superfluous increase in the memory bandwidth.

Upon reading out a reference image for motion compensation predictive decoding, when performing decoding processing for a dual-prime predictive-coded macroblock of a P picture and a bidirectionally predictive-coded macroblock of a B picture for which the readout rate is liable to become high, the memory control section 141 outputs a reduced image (reduced reference image) that is stored in the regions 241 to 244 to the pixel interpolation section 123 by control of the motion compensation section 122. Further, for a unidirectionally predictive-coded macroblock other than a macroblock encoded using dual-prime prediction, by control of the motion compensation section 122, the memory control section 141, as normal, reads out a reference image from the regions 225 and 226 and outputs the reference image to the motion compensation section 122.

The pixel interpolation section 123 as a reference image acquiring unit creates a reference image block of a normal number of pixels from the reduced reference image block by interpolation processing such as interpolation filter processing. The pixel interpolation section 123 supplies the reference image block created by interpolation to the motion compensation section 122.

The data amount of the reduced reference image block is less than a normal reference image block, and the memory control section 141 can read out the reduced reference image block at a lower rate than for a normal reference image block.

Next, the operations of the embodiment configured in this manner are described with reference to FIG. 5 and FIG. 7.

The operations of the present embodiment differ from those of the first embodiment in the respect that the present embodiment utilizes a reduced image for display as a reference image. Further, in the present embodiment, the access control of the memory 201 for using a reduced image for reference and for display is different to the first embodiment.

As shown in FIG. 5, other than the point that writing and reading out to and from the memory regions 225 and 226 for a reference image is not divided into even numbered rows and odd numbered rows, the writing and reading out to and from the memory regions 225 and 226 according to the present embodiment is the same as the writing and reading out to and from the regions 221 to 224 in FIG. 1.

For a unidirectionally predictive-coded macroblock other than a macroblock encoded using dual-prime prediction, reference image data that has been written in these regions 225 and 226 is used as a reference image. This reference image data is directly provided to the motion compensation section 122. Further, for a bidirectionally predictive-coded macroblock in a B picture and a dual-prime predictive-coded macroblock of a dual-prime picture, compressed image data that is stored in the regions 241 to 244 is used as a reference image.

Reduced image data that is stored in the reference and display memory regions 241 to 244 is used not only for display but also as a reference image. Accordingly, there are cases in which it is necessary to retain the reduced image data for use as a reference image even after the reduced image data is read out for display. Therefore, according to the present embodiment, reduced image data of four frames is stored in the four regions 241 to 244.

For example, restored image data of an I picture (I2) of the second frame is stored in the region 225 as a reference image and also converted into a reduced image by the reduced image generation section 131 and stored in the region 243.

At the time of decoding processing of unidirectionally predictive-coded macroblocks that are not macroblocks encoded using dual-prime prediction of a P picture (P5) of the fifth frame, in step S13, the motion compensation section 122 determines a blocking position based on the motion vector and reads out a reference image block of a macroblock size from a restored image of the I picture (I2) of the second frame that is stored in the region 225 of the memory 201 through the memory control section 141. Thus, at the time of decoding processing of one macroblock of unidirectionally predictive-coded macroblocks that are not macroblocks encoded using dual-prime prediction of the P picture (P5), as shown by a plain square mark in FIG. 3, it is sufficient to readout reference image data for a single macroblock (the same applies for a unidirectionally predictive-coded macroblock of a B picture).

As shown in FIG. 6, in the frame period following the decoding period of the P picture (P5) of the fifth frame, a reduced image of the I picture (I2) of the second frame is read out for display. In the present embodiment, the reduced image of the I picture (I2) is read out for reference and display when performing decoding processing of the bidirectionally predictive-coded macroblock of the B picture (B3) of the third frame, and furthermore, is also readout for reference for decoding processing of the B picture (B4) of the fourth frame.

That is, for decoding processing of the bidirectionally predictive-coded macroblocks of the B pictures (B3 and B4) of the third and fourth frames, reduced reference image blocks of the I and P pictures (I2 and P5) that are stored in the reference and display memory regions 243 and 244 are read out. More specifically, based on the motion vector, the motion compensation section 122 determines the blocking positions of reduced images of the I and P pictures (I2 and P5), and reads out reduced reference image blocks that consist of comparatively small data amounts and outputs the data to the pixel interpolation section 123 (step S24). In this connection, for decoding processing of a unidirectionally predictive-coded macroblock of a B picture, a reference image block of a macroblock size is read out from a restored image of the I picture (I2) of the second frame or the P picture (P5) of the fifth frame that is stored in the region 225 or region 226 of the memory 201 (step S13).

The pixel interpolation section 123 obtains reference image blocks for the I and P pictures by interpolating the reduced reference image blocks that are inputted, and outputs the reference image blocks to the motion compensation section 122 (step S15). Upon receiving the reference image blocks of the I picture (I2) and the P picture (P5), the motion compensation section 122 generates predictive pixel blocks, and by adding a prediction error from the inverse conversion processing section 121, obtains restored image data of bidirectionally predictive-coded macroblocks of B pictures (B3 and B4) of the third and fourth frames (step S116). Thus, according to the present embodiment, in decoding processing of a bidirectionally predictive-coded macroblock of a B picture also, it is sufficient to read out pixel data for approximately one macroblock that combines thinned-out reference image blocks from the memory region 243 and the memory region 244, to thereby enable decoding processing by reading out a number of reference pixels that is the same as the case of a unidirectionally predictive-coded macroblock other than a macroblock encoded using dual-prime prediction.

Thereafter, the same operations are repeated to perform writing and reading out as shown in FIG. 6 to and from the memory 201 to obtain reduced image data for each picture. In this connection, according to the present embodiment, not only for bidirectionally predictive-coded macroblocks of a B picture, but also for dual-prime predictive-coded macroblocks of a dual-prime picture, the motion compensation section 122 reads out reduced reference image blocks that are stored in the regions 241 to 244 of the memory 201. Accordingly, in this case also, it is sufficient to read out pixel data for approximately one macroblock that combines thinned-out reference image blocks of two kinds when performing decoding processing of one macroblock, and it is thus possible to carry out the decoding processing by reading out a number of reference pixels that is the same as the case of a unidirectionally predictive-coded macroblock other than a macroblock encoded using dual-prime prediction.

Thus, an effect that is the same as that of the first embodiment can be obtained according to the present embodiment.

Third Embodiment

Figure 8:
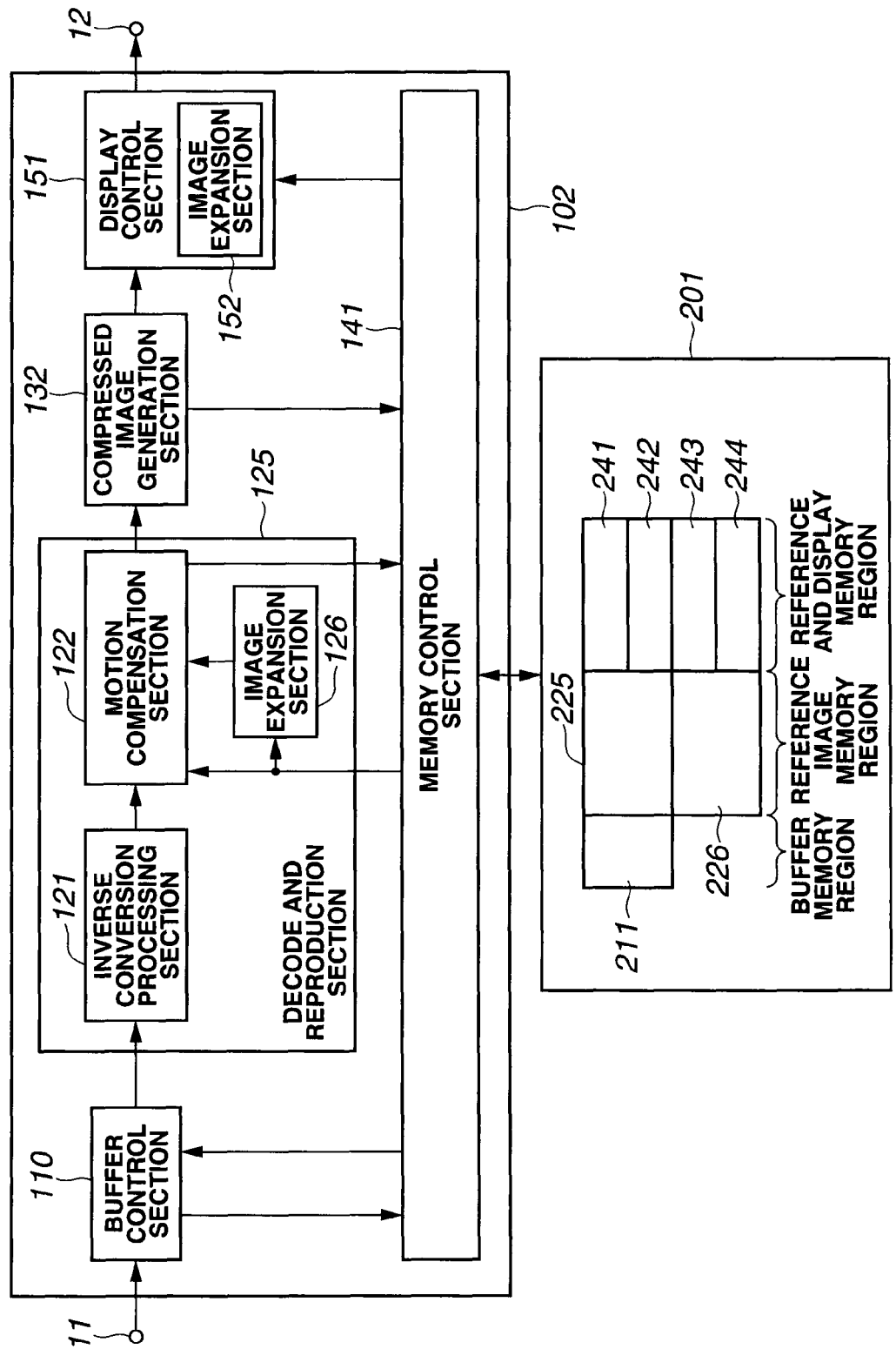
FIG. 8 is a block diagram that illustrates an image decoding apparatus according to a third embodiment of the present invention.
Figure 9:
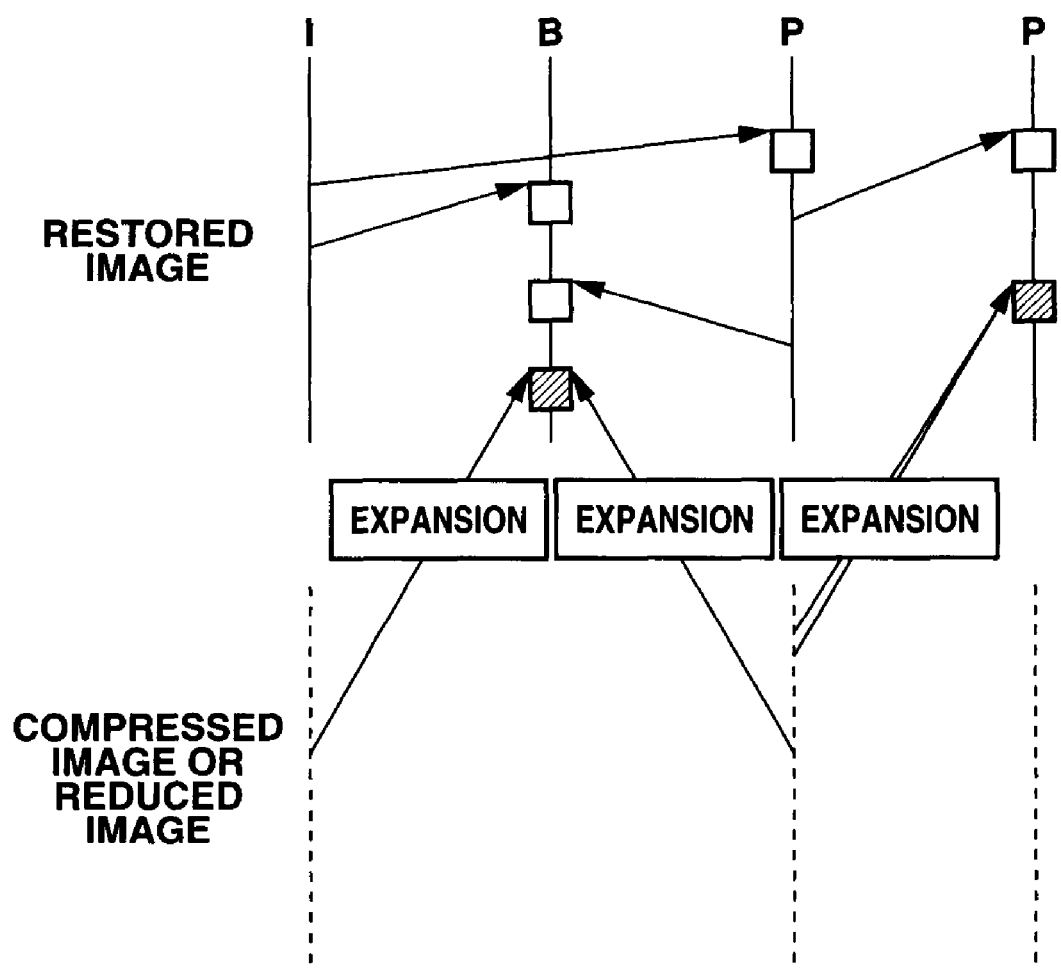
FIG. 9 is an explanatory drawing for describing a reference image used for decoding.
Figure 10:
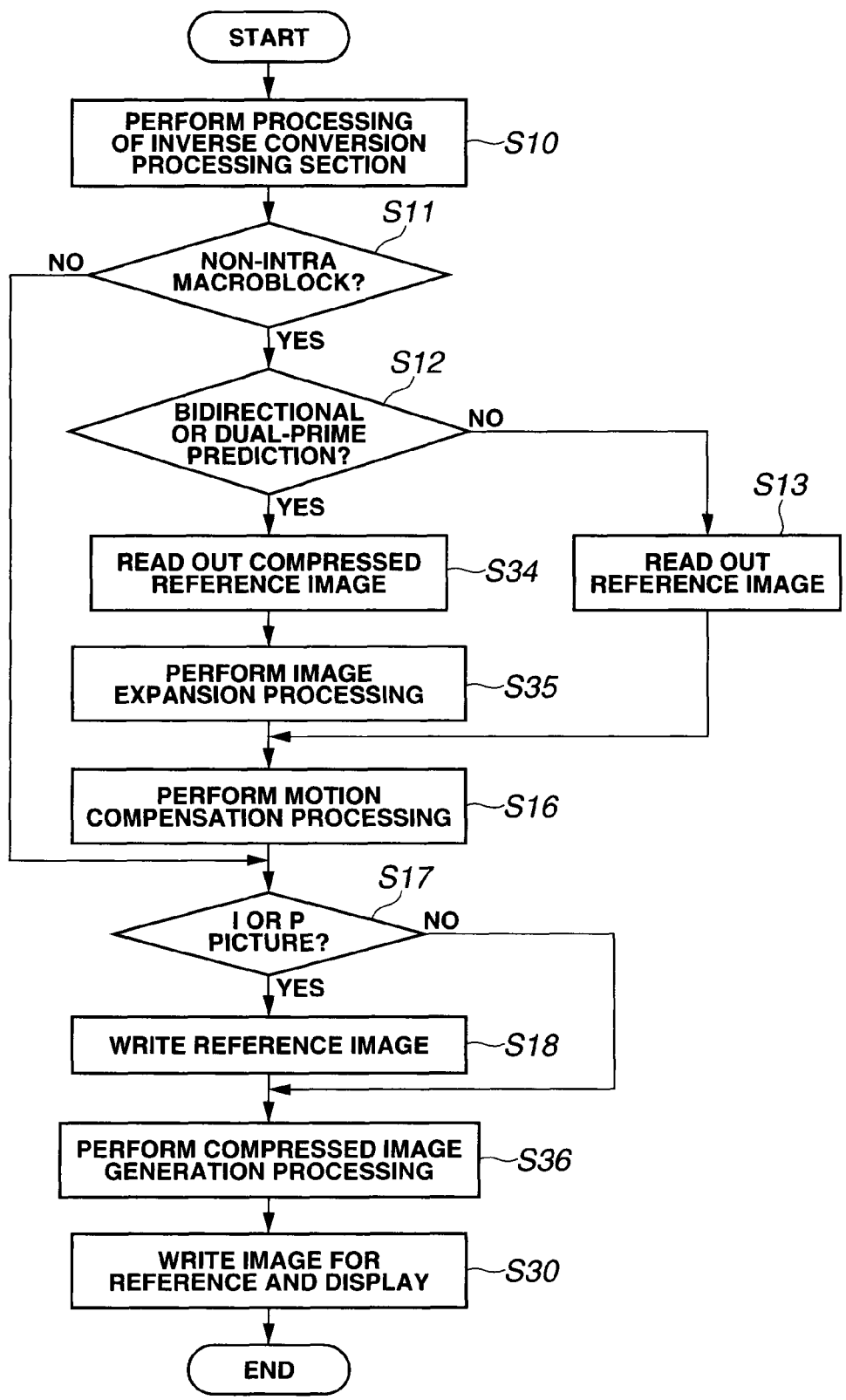
FIG. 10 is a flowchart for explaining decoding processing for each macroblock.

FIG. 8 to FIG. 10 relate to the third embodiment of the present invention. FIG. 8 is a block diagram that illustrates an image decoding apparatus. FIG. 9 is an explanatory drawing for describing a reference image used for decoding processing, and corresponds to FIG. 3. FIG. 10 is a flowchart for explaining decoding processing for each macroblock. For FIGS. 8 to 10, parts that are the same as those in FIGS. 5, 3, and 7, respectively, are denoted by the same symbols, and a description of those parts is omitted hereunder.

The present embodiment is configured to use compressed image instead of reduced image as image data that is stored in the reference and display memory regions 241 to 244 for display, and to obtain a reference image by expansion processing using the compressed image as a reference image. A video decoder 102 according to the present embodiment differs from the video decoder 101 shown in FIG. 5 in that the video decoder 102 employs a decode and reproduction section 125 having an image expansion section 126 as a reference image acquiring unit, and also employs a compressed image generation section 132 and, furthermore, employs a display control section 151 to which an image expansion section 152 is added.

The compressed image generation section 132 receives restored image data from the decode and reproduction section 125, and subjects the restored image data to compression processing to generate compressed image data. As the compressed image generation section 132, a simple compressor that uses an orthogonal transformer and a quantizer can be employed. The memory control section 141 is configured to store compressed image data from the compressed image generation section 132 in the regions 241 to 244 of the memory 201. In the present embodiment, compressed image data stored in the memory regions 241 to 244 is utilized not just for display, but also as a reference image.

The start addresses for writing reference image data to the memory regions 225 and 226 that the motion compensation section 122 requests are in macroblock units, and the memory control section 141 performs writing of reference image data to the memory 201 with good efficiency such that there is no superfluous increase in the memory bandwidth.

Further, the start addresses for writing image data to the regions 241 to 244 are also in reduced macroblock units (or units of an integral multiple thereof), and the memory control section 141 performs writing of reference image data to the memory 201 with good efficiency such that there is no superfluous increase in the memory bandwidth.

In the present embodiment also, upon reading out a reference image for motion compensation predictive decoding, when performing decoding processing for a dual-prime predictive-coded macroblock of a dual-prime picture and a bidirectionally predictive-coded macroblock of a B picture for which the readout rate is liable to become high, the memory control section 141 outputs to the image expansion section 126 a compressed image (compressed reference image) that is stored in the regions 241 to 244 by control of the motion compensation section 122. Further, for a unidirectionally predictive-coded macroblock other than a macroblock encoded using dual-prime prediction, by control of the motion compensation section 122, the memory control section 141, as normal, reads out a reference image from the regions 225 and 226 and outputs the reference image to the motion compensation section 122.

The image expansion section 126 as a reference image acquiring unit creates a normal reference image block from a compressed reference image block by inverse processing of the compressed image generation section 132. The image expansion section 126 supplies the reference image block that is created to the motion compensation section 122.

The data amount of the compressed reference image block is less than that of a normal reference image block, and thus the memory control section 141 can read out the compressed reference image block at a lower rate than for a normal reference image block.

Further, the image expansion section 152 inside the display control section 151 also creates a normal display image from a compressed image by inverse processing of the compressed image generation section 132 (it is sufficient that this expansion processing is processing of line units). The display control section 151 is configured to output the restored image data that has been expanded to the output terminal 12.

Next, the operations of the embodiment configured in this manner are described with reference to FIG. 9 and FIG. 10.

The operations of the present embodiment differ from the operations of the second embodiment only in the respect that a compressed image, not a reduced image, is used for reference and for display. As shown in FIG. 9, for a unidirectionally predictive-coded macroblock other than a macroblock encoded using dual-prime prediction, reference image data that is written in the regions 225 and 226 is used as a reference image. This reference image data is directly provided to the motion compensation section 122. Further, for a bidirectionally predictive-coded macroblock of a B picture and a dual-prime predictive-coded macroblock of a dual-prime picture, compressed image data that is stored in the regions 241 to 244 is used as a reference image.

The compressed image data is read out as a reference image at step S34, and provided to the image expansion section 126. The image expansion section 126 executes expansion processing at step S35 to restore the reference image. For the reference image that is obtained in this manner, a predictive pixel block is generated at the motion compensation section 122 and added to the output of the inverse conversion processing section 121 to obtain a restored image. The restored image from the motion compensation section 122 is converted to a compressed image at step S36 and written in the regions 241 to 244.

At the time of display, compressed image data that is read out from the reference and display memory regions 241 to 244 is provided to the image expansion section 152 of the display control section 151 to undergo expansion processing. The display control section 151 outputs the expanded restored image data to the output terminal 12. Thus, the restored image can be displayed on an unshown display device.

As described above, the same effect as that of the second embodiment can be obtained according to the present embodiment.

<Compressed Image Generation Section>

As the compressed image generation section 132 shown in FIG. 8, a component may be used that has a simpler configuration than a compression circuit on the encoding side. For example, a circuit that combines an orthogonal transformation circuit and a non-linear quantization circuit can be employed as the compressed image generation section 132.

Figure 11:
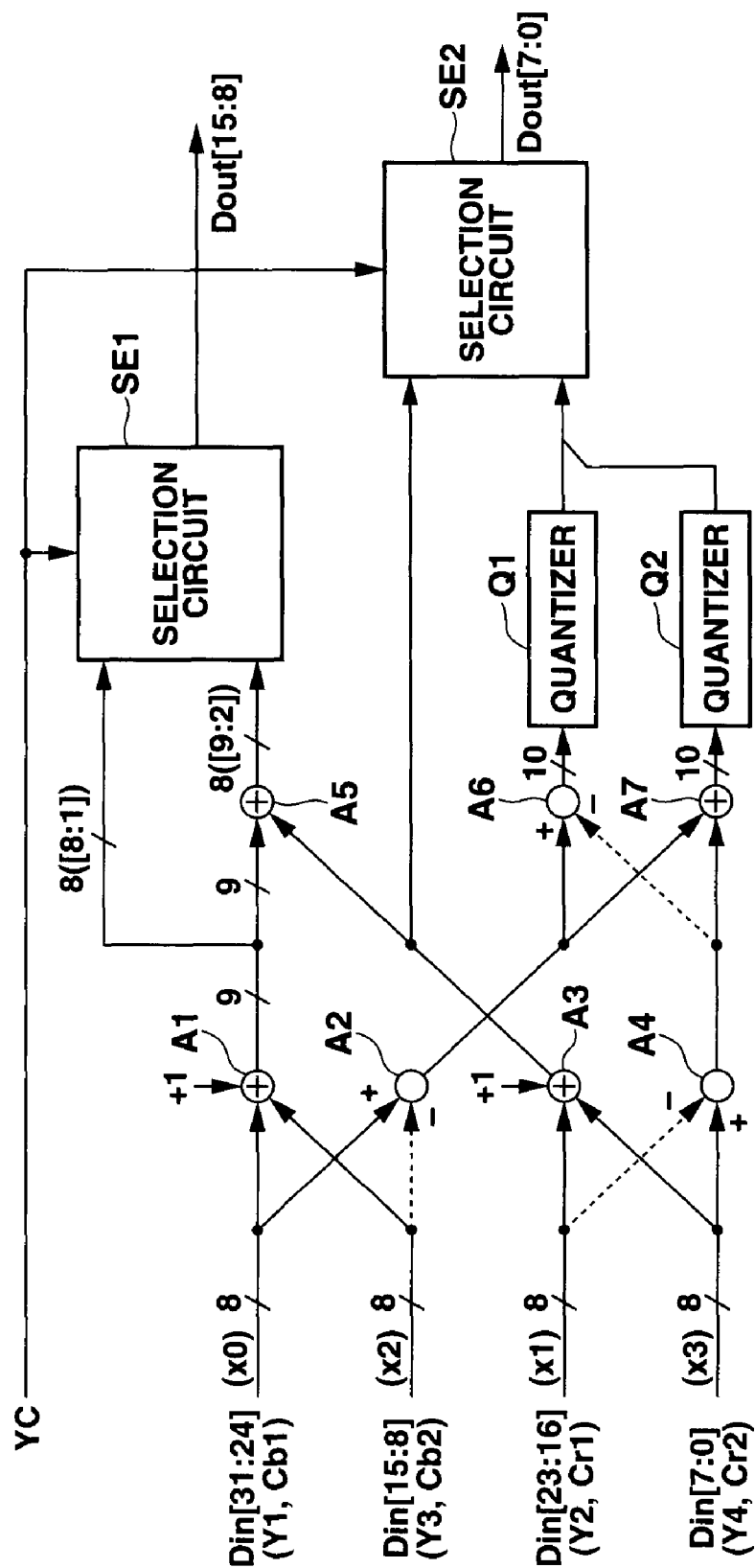
FIG. 11 is a circuit diagram that illustrates one example of a Hadamard transform circuit as a frequency conversion circuit.
Figure 12:
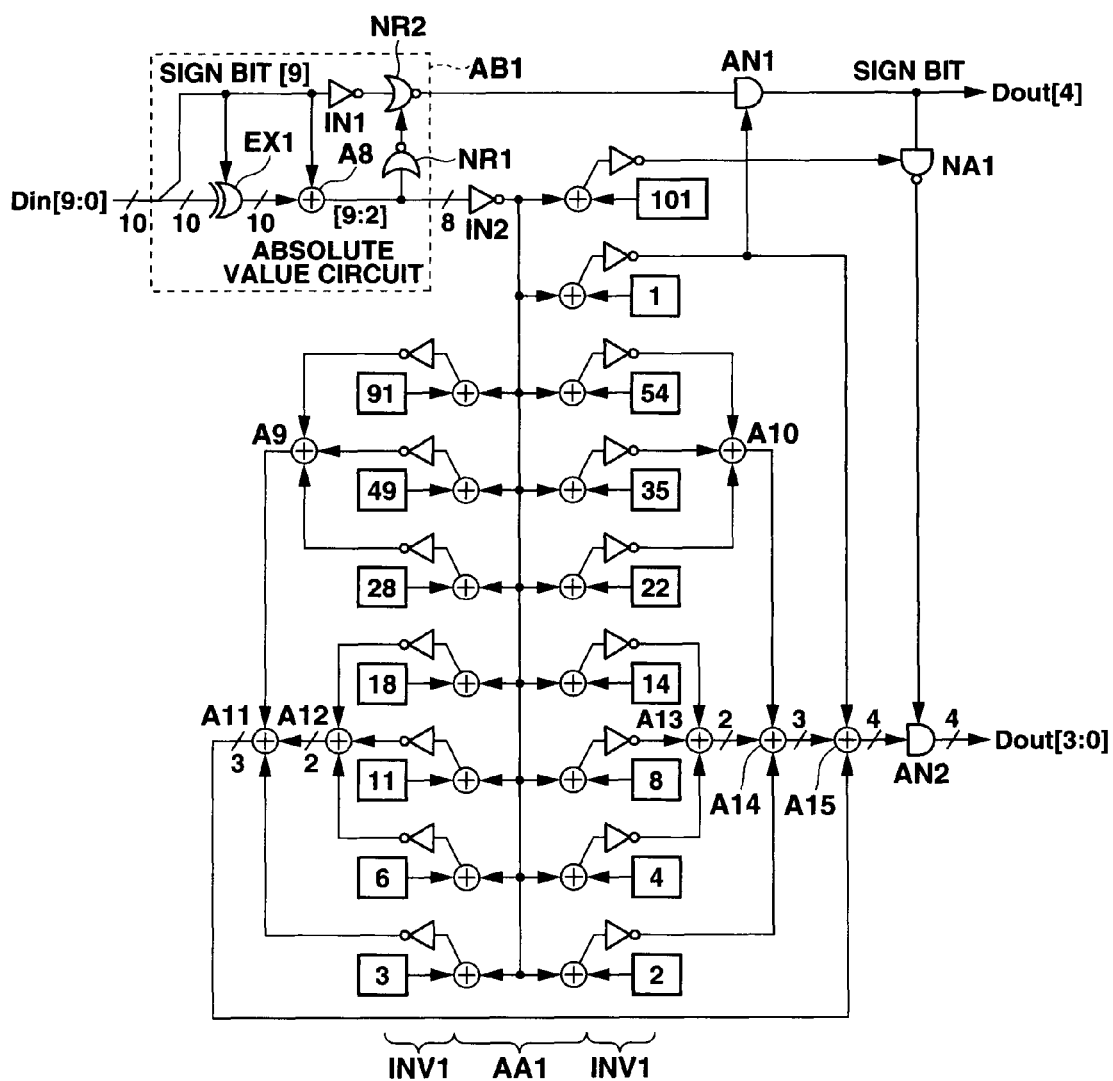
FIG. 12 is a circuit diagram illustrating one example of a quantizer Q1 in the Hadamard transform circuit shown in FIG. 11.
Figure 13:
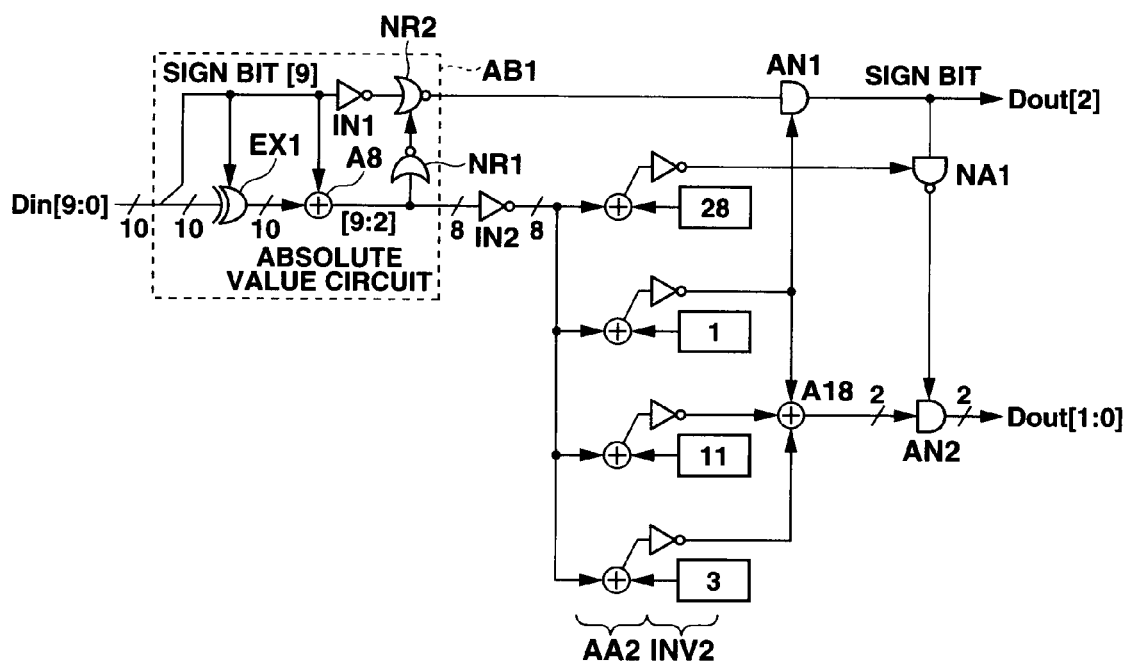
FIG. 13 is a circuit diagram illustrating one example of a quantizer Q2 in the Hadamard transform circuit shown in FIG. 11.

FIG. 11 to FIGS. 14A and 14B relate to a specific configuration example of the compressed image generation section 132 shown in FIG. 8. FIG. 11 shows one example of a Hadamard transform circuit as an orthogonal transformation circuit. FIGS. 12 and 13 illustrate examples of quantizers Q1 and Q2 in the Hadamard transform circuit, respectively. FIGS. 14A and 14B illustrate quantization tables.

In FIG. 11, respective pixels values x0, x2, x1, and x3 of separately inputted image data are provided to adders A1 to A4, respectively. The pixel values x0 to x3 are also provided to the adders A2, A4, A1, and A3, respectively. The output of the adders A1 to A4 is provided to the respective adders A5 to A7.

More specifically, the output of the adders A1 and A3 is provided to the adder A5. The adder A5 outputs the addition result as a direct-current component f0' of a conversion coefficient (f0=x0+x1+x2+x3+2). The output of the adders A2 and A4 is provided to the adder A6. The adder A6 subtracts the output of the adder A4 from the output of the adder A2 to output f1'=x0+x1−x2−x3 as output f1'. The output of the adders A2 and A4 is also provided to the adder A7. The adder A7 outputs f2'=x0−x1−x2+x3 as output f2'.

In a Hadamard transform circuit that uses four pixels, f3=x0−x1+x2−x3 can also be used as output f3. In the circuit shown in FIG. 11, a conversion coefficient f3 that includes the highest frequency component is not used as an output. Further, in the example shown in FIG. 11, it is assumed that each pixel value to be inputted is 8 bits. Accordingly, although the direct-current component f0' of the output of the adder A5 is 10 bits, in the circuit shown in FIG. 11, for the direct-current component f0' only the higher order 8 bits (hereunder, expressed as "8 ([9:2])") from the second to ninth bits among the zeroth to ninth bits are outputted as the direct-current component f0. That is, for the direct-current component f0, the output is that obtained by performing linear quantization processing that includes rounding off to the nearest integer.

Further, regarding the 10-bit output f2' and f3' of the adders A6 and A7, the bit numbers are converted to 5 bits or 3 bits by the respective non-linear quantizers Q1 and Q2, and output as conversion coefficients f2 and f3. In a period in which a luminance signal is specified by a switching signal YC that switches between a luminance signal and a color difference signal, a selection circuit SE1 selects the output of the adder A5 and a selection circuit SE2 selects the output of the quantizers Q1 and Q2. The output of the selection circuit SE2 becomes an output Dout [7:0] of 8 bits from the zeroth to seventh bit, and the output of the selection circuit SE1 becomes an output Dout [15:8] of 8 bits from the eighth to 15$^{th}$ bit. Thus, input image data of 32 bits from the zeroth to 31$^{st}$ bit is compressed into a conversion coefficient of 16 bits and outputted.

In this connection, when the input image data are color difference signals, color difference signals Cb1 and Cb2 are added at the adder A1 to calculate (Cb1+Cb2+1), and color difference signals Cr1 and Cr2 are added at the adder A3 to calculate (Cr1+Cr2+1). The higher order 8 bits in the 9-bit output of the adder A1 are supplied to the selection circuit SE1 as a conversion coefficient Cb of the color difference signal. Further, the higher order 8 bits in the 9-bit output of the adder A3 are supplied to the selection circuit SE2 as a conversion coefficient Cr of the color difference signal. These conversion coefficients of the color difference signals become output that has undergone mean value processing that includes rounding off to the nearest integer, and in a period in which a color difference signal is being specified by the switching signal YC, are selected by the selection circuits SE1 and SE2 and output as conversion coefficients of 16 bits from the zeroth to the 15$^{th}$ bit.

FIG. 12 is a view showing the configuration of the quantizer Q1 that nonlinearly quantizes 10-bit input data into 5-bit data. FIG. 13 is a view showing the configuration of the quantizer Q2 that nonlinearly quantizes 10-bit input data into 3-bit data.

In FIG. 12, a conversion coefficient Din [9:0] of 10 bits is provided to an absolute value circuit AB1. The absolute value circuit AB1 is configured by an exclusive-OR circuit EX1, an adder A8, an inverter IN1, and NOR circuits NR1 and NR2.

The 10-bit conversion coefficient is provided to the exclusive-OR circuit EX1. At the exclusive-OR circuit EX1, a sign bit Din [9] that indicates a positive or negative value of the conversion coefficient is also provided, and an exclusive OR operation is performed for the two values. The output of the exclusive-OR circuit EX1 is received by the adder A8, and added to the sign bit Din [9]. The higher order 8 bits 8[9:2] among the output of the adder A8 indicate the higher order 8 bits of the absolute value of the 10-bit conversion coefficient. The higher order 8 bits of the absolute value of the conversion coefficient from the adder A8 are supplied to each adder in the adder group AA1 via the inverter IN2, and are also supplied to the NOR circuit NR1. Meanwhile, the sign bit Din[9] is inputted to the NOR circuit NR2 together with the output of the NOR circuit NR1 via the inverter IN1, and a sign bit that is adjusted at the NOR circuit NR2 such that the higher order 8 bits of the absolute value of the conversion coefficient become positive when zero is supplied to an AND circuit AN1.

Respective comparison values 1, 2, 3, 4, 6, 8, 11, 14, 18, 22, 28, 35, 49, 54, 91, and 101 are provided to the 16 adders that configure the adder group AA1. Each adder of the adder group AA1 receives an inverted signal of the higher order 8 bits of the absolute value of the conversion coefficient from the inverter IN2. When the higher order 8 bits of the absolute value of the conversion coefficient is less than each comparison value, each adder generates a carry output.

A carry output from each adder of the adder group AA1 is outputted through each inverter of the respective inverter group INV1. The outputs from each inverter of the inverter group INV1 are added by the adders A9 to A15 and supplied to the AND circuit AN2.

At the AND circuit AN1, a carry output from an adder to which a comparison value 1 of the adder group AA1 is inverted and received. When the higher order 8 bits of the absolute value of the conversion coefficient is 1 or more, the AND circuit AN1 outputs the sign bit as the fourth bit in the 5-bit output Dout.

Further, this sign bit is also provided to a NAND circuit NA1. A carry output from the adder to which a comparison value 101 of the adder group AA1 is inverted and provided to the NAND circuit NA1. When the absolute value of the conversion coefficient is 101 or more, the NAND circuit NA1 provides a logical value "0" to the AND circuit AN2. When the output of the NAND circuit NA1 is a logical value "1", the AND circuit AN2 outputs the output of the adder A15 as four bits from the zeroth to third in the 5-bit Dout, and when the output of the NAND circuit NA1 is a logical value "0", the AND circuit AN2 outputs 0000 as four bits from the zeroth to third in Dout.

FIG. 14A shows quantized output by the quantizer Q1 shown in FIG. 12. The input range of the conversion coefficient is −128 to 0 to 127. Each time the higher order 8 bits of the absolute value of an inputted conversion coefficient are the same as comparison values 1, 2, 3, 4, 6, 8, 11, 14, 18, 22, 28, 35, 49, 54, and 91, the INV1 output at the subsequent stage of each adder of the adder group AA1 becomes 1. The INV1 output is added by the adders A9 to A15. The output of the adder A15 becomes a coefficient obtained by nonlinearly converting the input conversion coefficient.

For example, when the higher order 8 bits of the absolute value of the input conversion coefficient are 9, the INV1 output at the subsequent stage of the adders into which the comparison values 1, 2, 3, 4, 6, and 8 are inputted is 1, and the output of the adder A15 becomes 0110 that is the number for which the INV1 output is 1. Thus, the 5-bit quantized output (index) shown in FIG. 14A is obtained. In this connection, the highest order bit in the index shown in FIG. 14A and FIG. 14B is a sign bit.

FIG. 13 shows the configuration of a quantizer Q2 that nonlinearly quantizes input data of 10 bits into data of 3 bits. FIG. 12 illustrates an example that employs an adder group AA2 equipped with four adders. Each adder in the adder group AA2 compares the respective comparison values 1, 3, 11, and 28 with the inverted higher order 8 bits of the absolute value of an inputted conversion coefficient. Carry output from each adder of the adder group AA2 is supplied to the adder A18 through each inverter of the inverter group INV2.

FIG. 14B shows quantized output from the quantizer Q2 shown in FIG. 13. The input range of the conversion coefficient is −128 to 0 to 127. Each time the higher order 8 bits of the absolute value of an inputted conversion coefficient are the same as comparison values 1, 3, and 11, the INV2 output at the subsequent stage of each adder of the adder group AA2 becomes 1. Thus, the 3-bit quantized output (index) shown in FIG. 14B is obtained.

As described above, each 5-bit and 3-bit quantized output from the quantizers Q1 and Q2 is supplied to the selection circuit SE2 as conversion coefficients f1 and f2. Thus, the compressed image generation section shown in FIG. 11 converts a direct-current component f0' obtained by Hadamard transformation into 8-bit data f0 by linear quantization, and converts conversion coefficients f1' and f2' obtained by Hadamard transformation into 8-bit data that is combined by nonlinear quantization. Thus, it is possible to compress an image at a sufficient compression rate to store the image as a reference image, and adequately lower the readout rate of the reference image when performing decoding processing for a bidirectionally predictive-coded macroblock of a B picture or a dual-prime predictive-coded macroblock of a dual-prime picture.

<Image Expansion Section>

Figure 15:
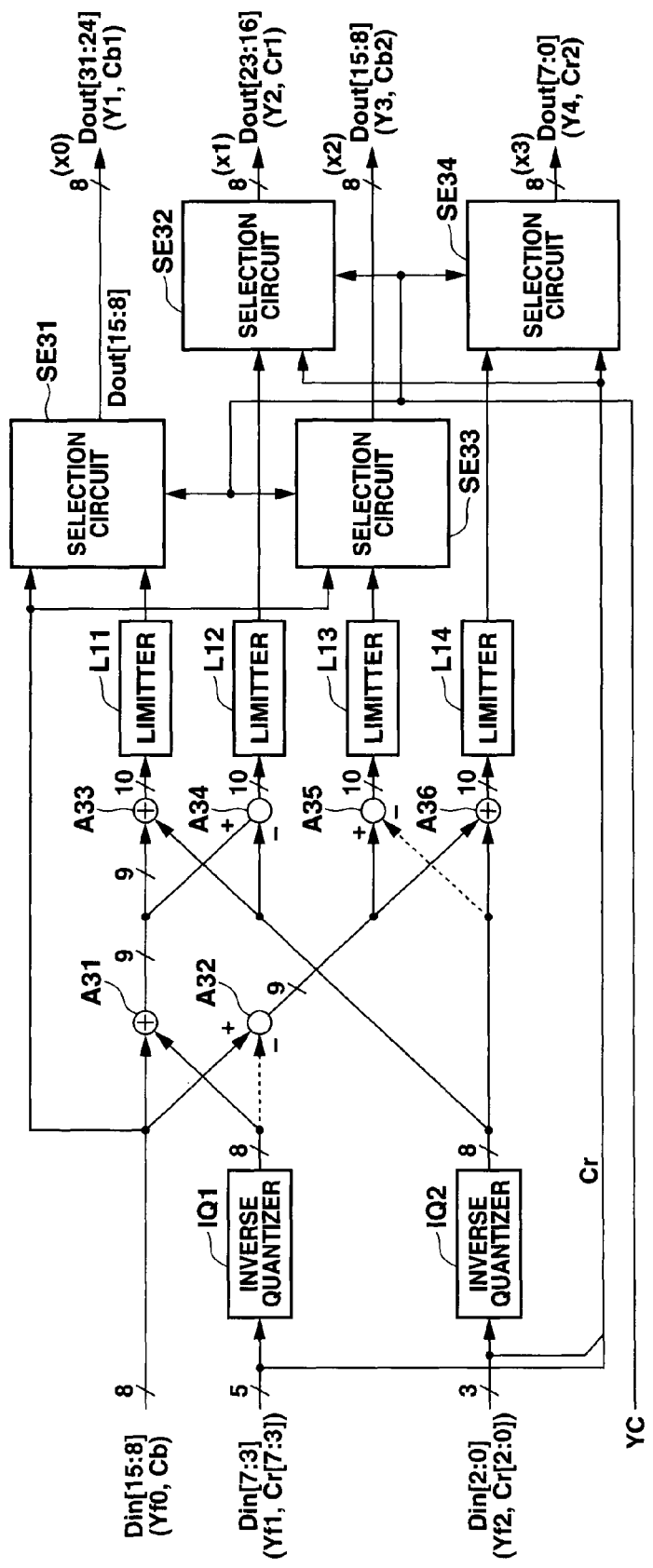
FIG. 15 is a circuit diagram illustrating one example of an image expansion circuit.
Figure 16:
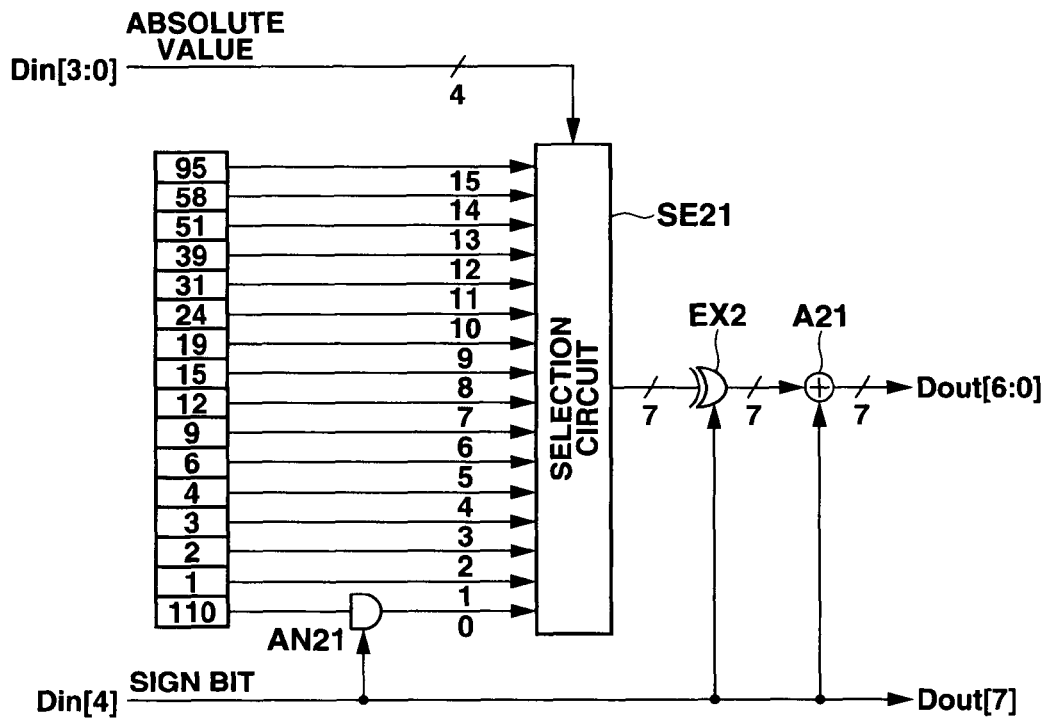
FIG. 16 is a circuit diagram illustrating one example of an inverse quantizer IQ1 shown in FIG. 15.
Figure 17:
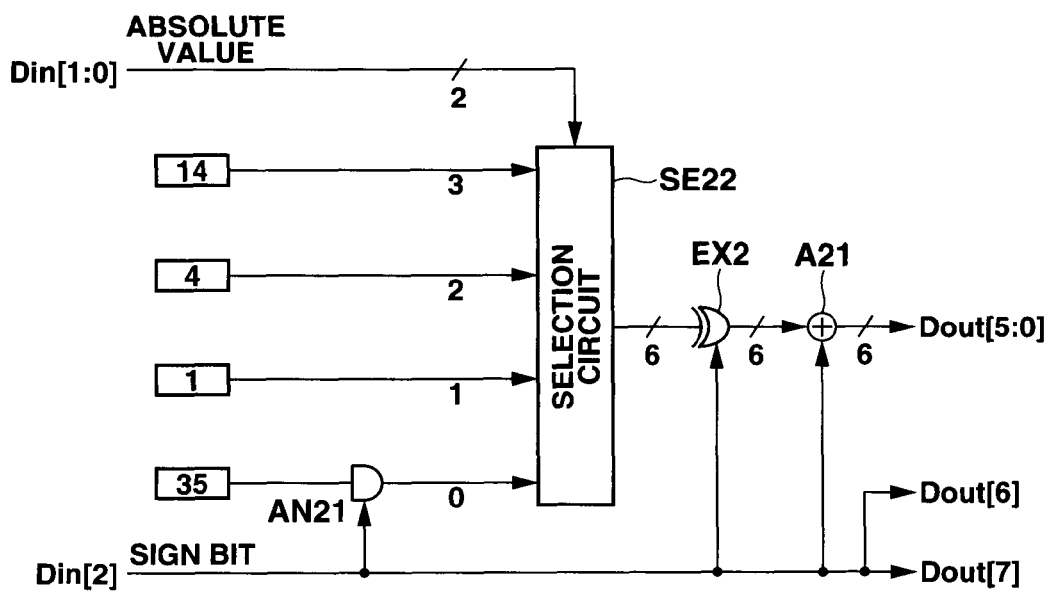
FIG. 17 is a circuit diagram illustrating one example of an inverse quantizer IQ2 shown in FIG. 15.
Figure 18:
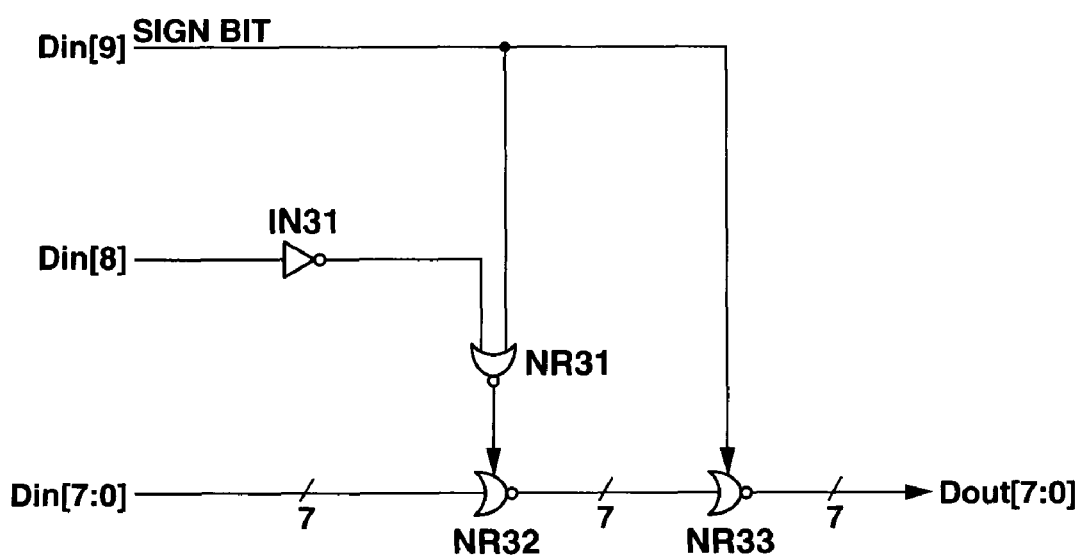
FIG. 18 is a circuit diagram illustrating one example of limiters L11 to L14 shown in FIG. 15.

As the image expansion sections 126 and 152 in FIG. 8, a configuration that corresponds to the compressed image generation section 132 is employed. FIG. 15 to FIGS. 19A and 19B relate to a specific configuration of an image expansion section that corresponds to the compressed image generation section shown in FIG. 11. FIG. 15 illustrates one example of an image expansion circuit. FIG. 16 to FIG. 18 show an example of the respective inverse quantizers IQ1 and IQ2 and limiters L11 to L14 shown in FIG. 15. FIG. 19A and FIG. 19B illustrate inverse quantization tables. FIG. 19A illustrates inverse quantization processing by the inverse quantizer IQ1, and FIG. 19B illustrates inverse quantization processing by the inverse quantizer IQ2.

In FIG. 15, the respective higher order 5 bits and lower order 3 bits in the lower order 8 bits [7:0] of the output Dout shown in FIG. 11 are inputted as Din [7:3] and Din [2:0] to the inverse quantizers IQ1 and IQ2 respectively.

FIG. 16 illustrates the configuration of the inverse quantizer IQ1. The inverse quantizer IQ1 has a selection circuit SE21. The values 110, 1, 2, 3, 4, 6, 9, 12, 15, 19, 24, 31, 39, 51, 58, and 95 are provided as representative values to the selection circuit SE21. The selection circuit SE21 is provided with the lower order 4 bits Din [3:0] that represent the absolute value of a conversion coefficient compressed to 5 bits. The selection circuit SE21 selects a representative value using the absolute value of the conversion coefficient. More specifically, the selection circuit SE21 converts the 4-bit conversion coefficients for 0 to 15 into a 7-bit representative value and outputs that representative value. In this connection, the representative value 110 is provided to the selection circuit SE21 through the AND circuit AN21. A sign bit is also provided to the AND circuit AN21, and the representative value 110 is only selected when the sign bit is 1, that is, in the case of a negative conversion coefficient, and is zero for a conversion coefficient when the sign bit is zero (i.e. positive).

The representative value from the selection circuit SE21 is provided to an exclusive-OR circuit EX2. The exclusive-OR circuit EX2 performs an exclusive OR operation with the sign bit, and outputs the operation result to the adder A21. The adder A21 adds the output of the exclusive-OR circuit EX2 and the sign bit. The output of the adder A21 is digital data that represents the absolute value of the inputted conversion coefficient with the lower order 7 bits. The output of the adder A21 is the lower order 7 bits Dout [6:0] among the 8-bit conversion coefficient that has undergone inverse quantization, and the sign bit is used as it is as an output Dout [7] of the $8^{th}$ bit that is the highest order bit.

As shown in FIG. 19A, the 5-bit input data is converted into a representative value represented by 7 bits.

FIG. 17 illustrates the configuration of the inverse quantizer IQ2. The inverse quantizer IQ2 has a selection circuit SE22. The values 35, 1, 4, and 14 are provided as representative values to the selection circuit SE22. The selection circuit SE22 is provided with the lower order 2 bits Din [1:0] that represent the absolute value of a conversion coefficient compressed to 3 bits. The selection circuit SE22 selects a representative value using the absolute value of the conversion coefficient. More specifically, the selection circuit SE22 converts the 2-bit conversion coefficients for 0 to 3 into a 6-bit representative value and outputs that representative value. In this connection, the representative value 35 is provided to the selection circuit SE22 through the AND circuit AN21.

Thus, as shown in FIG. 19B, a 7-bit representative value corresponding to 3-bit conversion coefficients is outputted from the selection circuit SE22. The output of the adder A21 becomes digital data Dout [5:0] representing absolute value of the inputted conversion coefficient with the lower order 6 bits. Further, the sign bit is used as it is as the higher order 2 bits Dout [7] and Dout [6].

As shown in FIG. 19B, the 3-bit input data is converted into a representative value represented by 7 bits.

In FIG. 15, output of the direct-current component f0 and the inverse quantizer IQ1 is provided to the adders A31 and A32. The adder A31 adds the direct-current component f0 and the conversion coefficient f1 from the inverse quantizer IQ1, and the adder A32 subtracts the conversion coefficient f1 from the direct-current component f0.

The adder A33 adds the output of the adder A31 and the output of the inverse quantizer IQ2. The adder A34 subtracts the output of the inverse quantizer IQ2 from the output of the adder A31. The adder A35 subtracts the output of the inverse quantizer IQ2 from the output of the adder A32. The adder A36 adds the output of the adder A32 and the output of the inverse quantizer IQ2. More specifically, the conversion coefficients f0 to f2 are subjected to inverse Hadamard transformation to restore the 10-bit original pixel values x0 to x3.

The restored pixel values x0 to x3 from the adders A33 to A36 are provided to the respective limiters L11 to L14. FIG. 18 is a circuit diagram illustrating a specific configuration of the limiters L11 to L14.

The limiters L11 to L14 are configured in the same manner, and as shown in FIG. 18, they have an inverter IN31 and NOR circuits NR31 to NR33. The highest order bit Din [9] of each pixel value of 10 bits is a sign bit. The lower order 8 bits Din [7:0] of the pixel values are provided to the NOR circuit NR32, and the $9^{th}$ bit Din [8] is provided to the inverter IN31. The output of the inverter IN31 and the sign bit are provided to the NOR circuit NR31, and the output of the NOR circuit NR31 is provided to the NOR circuit NR32. The output of the NOR circuit NR32 and the sign bit are provided to the NOR circuit NR33. Eight bits of the output of the NOR circuit NR33 are outputted as Dout [7:0].

When the $9^{th}$ bit is 0, the output of the inverter IN31 is 1 and the NOR circuit NR31 always outputs 0. Therefore, the NOR circuits NR32 and NR33 function as inverters, and the higher order 8 bits of an inputted 10-bit pixel value is outputted as it is.

When the $9^{th}$ bit is 1, the output of the inverter IN31 is 0, and when the sign bit is 0 the NOR circuit NR31 outputs 1. Accordingly, in this case, the NOR circuit NR32 outputs 0 and the NOR circuit NR33 outputs 1. Thus, when the $9^{th}$ bit is 1, the output Dout [7:0] for which the higher order 8 bits are 1 is outputted. In this connection, only a positive value is used as the output. Therefore, the configuration is such that, when a sign bit is provided to the NOR circuit NR32 and the sign bit is 1 (negative), the output of the NOR circuit NR32 is made 0.

Thus, the limiters L11 to L14 limit an inputted pixel value to a maximum value that can be represented with 8 bits and output the value. The outputs of the limiters L11 to L14 are outputted as Dout [31:24], Dout [23:16], Dout [15:8], and Dout [7:0] through the respective selection circuits SE31 to SE34.

In this connection, when an inputted pixel is a color difference signal, Din [7:0] is a color difference signal Cr, and Din [15:8] is a color difference signal Cb. The color difference signal Cr is provided to the selection circuits SE31 and SE33, and the color difference signal Cb is provided to the selection circuits SE32 and SE34. When the switching signal YC indicates a color difference signal the selection circuits SE31 to SE34 select a color difference signal, and when the switching signal YC indicates a luminance signal the selection circuits SE31 to SE34 select a luminance signal.

In this manner, 32-bit luminance signals and color difference signals are obtained as the outputs Dout [31:24], Dout [23:16], Dout [15:8], and Dout [7:0].

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:
1. An image decoding apparatus, including:
an inverse conversion processing section into which is inputted encoded image data that is encoded for each region of a predetermined number of pixels by processing that includes motion compensation predictive coding processing that encodes a prediction error between a reference image and an image of an encoding object, the inverse conversion processing section being configured to obtain the prediction error or a restored image of the encoding object image by inverse processing of the encoding processing;
a motion compensation section configured to obtain a restored image for each of the regions of the predetermined number of pixels by adding the prediction error and the reference image;
a data amount reducing section configured to generate a reduced size image of the restored image;
a storage section configured to store the restored image and the reduced size image of the restored image; and
a reference image acquisition section configured to read out the restored image and the reduced size image of the restored image from the storage section for addition processing of the motion compensation section, wherein, when an image of a processing object of the motion compensation section is encoded by an encoding mode that uses reference pixels that include two times or more number of pixels of the region of the predetermined number of pixels, the reference image acquisition section obtains a reference image by reading out the reduced size image of the restored image from the storage section and obtains the restored image from the reduced size image of the restored image by expanding process, and when an image of a processing object of the motion compensation section is encoded by an encoding mode that uses reference pixels that include less than two times a number of pixels of the region of the predetermined number of pixels, the reference image acquisition section obtains a reference image by reading out the restored image from the storage section.

2. The image decoding apparatus according to claim 1, wherein the data amount reducing section is configured to reduce a data amount of the restored image by image reduction processing or image compression processing.

3. The image decoding apparatus according to claim 1, further comprising:
a compressed image generation section configured to generate a compressed image from the restored image; and
a compressed image storage section configured to retain the compressed image that is generated by the compressed image generation section for display use;
wherein, when an image of a processing object of the motion compensation section is encoded by an encoding mode that uses reference pixels of a number of pixels that is two times or more greater than a number of pixels of the region of the predetermined number of pixels, the reference image acquisition section obtains the reference image by reading out a reference image for which a data amount is reduced from the storage section or reading out the compressed image from the compressed image storage section and restoring the data amount of the reference image to the original data amount.

4. The image decoding apparatus according to claim 1, wherein, when the encoded image data is obtained by bidirectional predictive coding or dual-prime predictive coding, the reference image acquisition section obtains a reference image by reading out a reference image for which a data amount has been reduced from the storage section and restoring the data amount of the reference image to the original data amount.

5. An image decoding method, including:
inputting encoded image data that is encoded for each region of a predetermined number of pixels by processing that includes motion compensation predictive coding processing that encodes a prediction error between a reference image and an image of an encoding object, and obtaining the prediction error or a restored image of the encoding object image by inverse processing of the encoding processing;
performing motion compensation processing that obtains a restored image for each of the regions of the predetermined number of pixels by adding the prediction error and the reference image;
generating a reduced size image of the restored image;
storing the restored image and the reduced size image of the restored image; and
reading out the stored restored image and the reduced size image of the restored image for addition processing during the motion compensation processing, wherein, when an image of a processing object of the motion compensation processing is encoded by an encoding mode that uses reference pixels that include two times or more number of pixels of the region of the predetermined number of pixels, a reference image is obtained by reading out the stored reduced size image of the restored image and obtaining the restored image from the reduced size image of the restored image by expanding process, and when an image of a processing object of the motion compensation processing is encoded by an encoding mode that uses reference pixels that include less than two times a number of pixels of the region of the predetermined number of pixels, a reference image is obtained by reading out the stored restored image.

6. The image decoding method according to claim 5, wherein the data amount of the restored image is reduced by image reduction processing or image compression processing.

7. The image decoding method according to claim 5, further including:
generating a compressed image from the restored image; and
retaining the compressed image that is generated by the compressed image generating processing for display use;
wherein, when an image that is a processing object of the motion compensation processing is encoded by an encoding mode that uses reference pixels of a number of pixels that is two times or more greater than a number of pixels of the region of the predetermined number of pixels, obtaining the reference image by reading out a reference image for which a data amount has been reduced or reading out the compressed image and restoring the reference image to the original data amount.

8. The image decoding method according to claim 5, wherein, when the encoded image data is obtained by bidirectional predictive coding or dual-prime predictive coding, the reference image is obtained by reading out a reference image for which a data amount has been reduced and restoring the reference image to the original data amount.

* * * * *